US012658053B2

(12) United States Patent
Yamazaki

(10) Patent No.: US 12,658,053 B2
(45) Date of Patent: Jun. 16, 2026

(54) DRIVING ASSISTANCE DEVICE, DRIVING ASSISTANCE METHOD, AND STORAGE MEDIUM

(71) Applicant: HONDA MOTOR CO., LTD., Tokyo (JP)

(72) Inventor: Taku Yamazaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 17 days.

(21) Appl. No.: 19/036,733

(22) Filed: Jan. 24, 2025

(65) Prior Publication Data

US 2025/0259545 A1 Aug. 14, 2025

(30) Foreign Application Priority Data

Feb. 8, 2024 (JP) ................................ 2024-017994

(51) Int. Cl.
*G08G 1/16* (2006.01)

(52) U.S. Cl.
CPC .................................... *G08G 1/166* (2013.01)

(58) Field of Classification Search
CPC ..................................................... G08G 1/166
See application file for complete search history.

(56) References Cited

U.S. PATENT DOCUMENTS 10,086,699 B2 * 10/2018 Konet .................... B60K 35/22
11,100,804 B2 8/2021 Kurehashi
12,122,408 B2 * 10/2024 Oba .................... G01C 21/3697
2008/0165029 A1 * 7/2008 Fu ........................ B60R 21/0134 340/903
2015/0070158 A1 * 3/2015 Hayasaka ................. G01S 7/22 340/438
2016/0351049 A1 * 12/2016 Hamada ................ H04W 4/027
2019/0012912 A1 * 1/2019 Kim ........................ B60K 35/10
2019/0071074 A1 * 3/2019 Gokan .................. B60W 30/09
2019/0287406 A1 9/2019 Kurehashi
2019/0367048 A1 * 12/2019 Yoshida ................. G08G 1/166

FOREIGN PATENT DOCUMENTS

JP 2020-016950 A 1/2020
JP 7054636 B2 4/2022

* cited by examiner

*Primary Examiner* — Mohamed Barakat
(74) *Attorney, Agent, or Firm* — THOMAS | HORSTEMEYER, LLP

(57) ABSTRACT

The present invention provides a driving assistance device configured to perform driving assistance for a self-vehicle, comprising: an acquisition unit configured to acquire peripheral vehicle information of a peripheral vehicle present around the self-vehicle, from the peripheral vehicle by vehicle-to-vehicle communication; a first prediction unit configured to predict a collision possibility between the self-vehicle and the peripheral vehicle based on self-vehicle information of the self-vehicle and the acquired peripheral vehicle information; a first display unit configured to, when a first state is detected, display attention-calling information for calling attention to approach of the peripheral vehicle in a first period from a timing at which the first state is detected; and a second display unit configured to, when a second state is detected, display direction information indicating an approach direction of the peripheral vehicle.

11 Claims, 11 Drawing Sheets

DRIVING ASSISTANCE DEVICE, DRIVING ASSISTANCE METHOD, AND STORAGE MEDIUM

CROSS-REFERENCE TO RELATED APPLICATION(S)

This application claims priority to and the benefit of Japanese Patent Application No. 2024-017994 filed on Feb. 8, 2024, the entire disclosure of which is incorporated herein by reference.

BACKGROUND OF THE INVENTION

Field of the Invention

The present invention relates to a driving assistance device, a driving assistance method, and a storage medium.

Description of the Related Art

In recent years, efforts to provide access to sustainable transportation systems in consideration of vulnerable people among traffic participants have been gaining momentum. In order to realize this, research and development for further improving traffic safety and convenience is focused on research and development related to preventive safety technique. As such preventive safety technique, a device that provides driving assistance for preventing collision with peripheral vehicles (other vehicles) and the like has been known. Japanese Patent Laid-Open No. 2020-16950 describes that another vehicle present on the front lateral side of a self-vehicle is detected based on a captured image from an image capturing unit mounted on the self-vehicle, and collision between the self-vehicle and the other vehicle is determined. In addition, Japanese Patent No. 7054636 describes that position information of an intersection where a traveling trajectory of a self-vehicle and a traveling trajectory of another vehicle intersect is registered in a storage unit to perform driving assistance for the self-vehicle when the self-vehicle passes through the intersection again.

In driving assistance for a self-vehicle, it is annoying and inappropriate for a driver of the self-vehicle when display of information for preventing collision with other vehicles is frequently updated (switched), such as when there are a plurality of other vehicles predicted to collide with the self-vehicle.

SUMMARY OF THE INVENTION

The present invention provides, for example, an advantageous technique for appropriately performing driving assistance for a self-vehicle. Accordingly, the present disclosure contributes to development of a sustainable transportation system.

According to one aspect of the present invention, there is provided a driving assistance device configured to perform driving assistance for a self-vehicle, comprising: an acquisition unit configured to acquire peripheral vehicle information including a current position, a speed, and a traveling trajectory of a peripheral vehicle present around the self-vehicle, from the peripheral vehicle by vehicle-to-vehicle communication; a first prediction unit configured to predict a collision possibility between the self-vehicle and the peripheral vehicle based on self-vehicle information including a current position, a speed, and a traveling trajectory of the self-vehicle and the peripheral vehicle information acquired by the acquisition unit; a first display unit configured to, when a first state is detected, display attention-calling information for calling attention to approach of the peripheral vehicle in a first period from a timing at which the first state is detected, the first state being a state in which the collision possibility is predicted by the first prediction unit and a start operation is performed by a driver of the self-vehicle; and a second display unit configured to, when a second state is detected, display direction information indicating an approach direction of the peripheral vehicle, the second state being a state in which the collision possibility is predicted by the first prediction unit, wherein the first display unit suppresses update of the attention-calling information until a second period shorter than the first period elapses from the timing even in a case where the first state is newly detected, and wherein the second display unit updates the direction information when the second state is newly detected even in a case where the second period has not elapsed from the timing.

Further features of the present invention will become apparent from the following description of exemplary embodiments with reference to the attached drawings.

DESCRIPTION OF THE EMBODIMENTS

Figure 1:
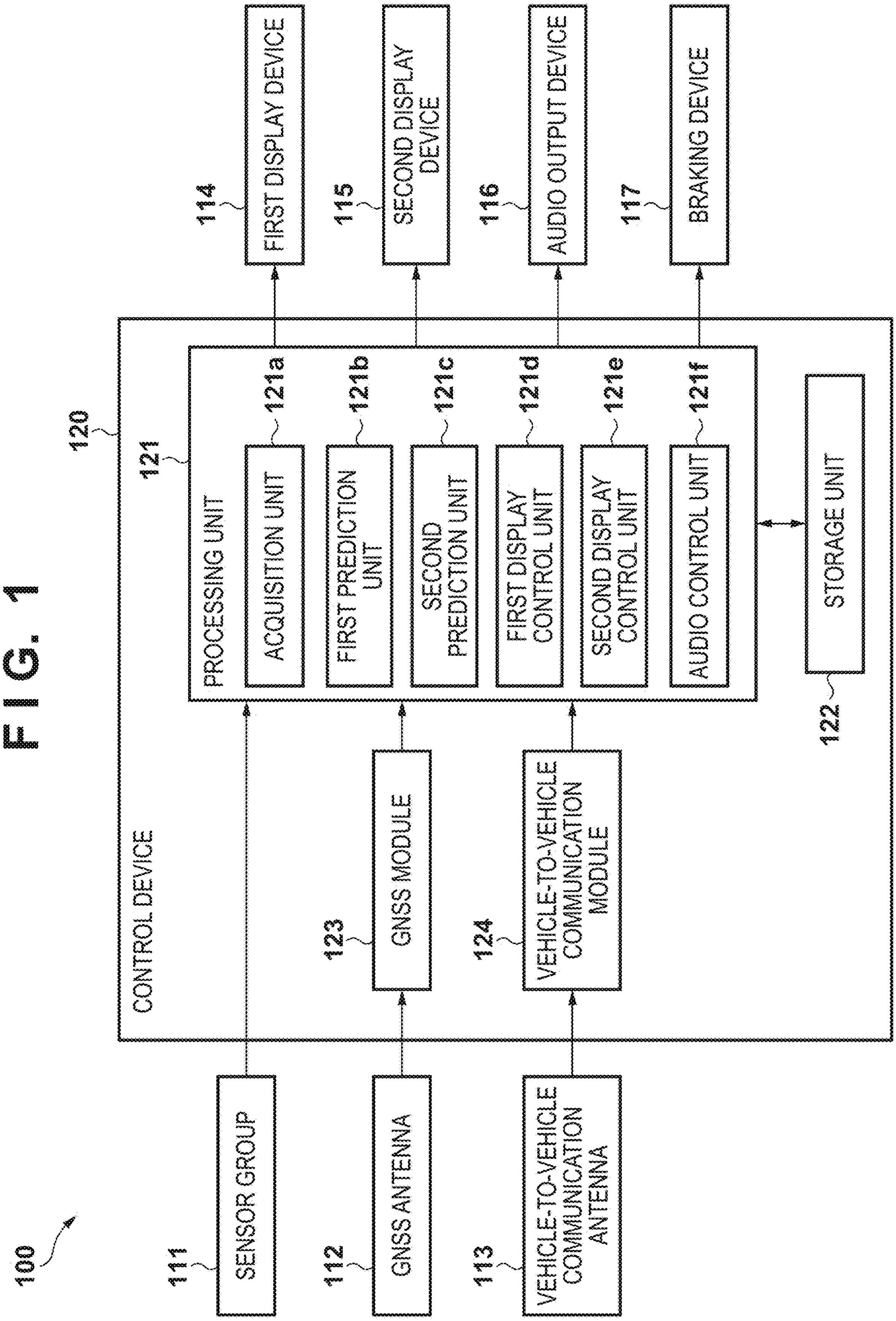
FIG. 1 is a diagram illustrating a configuration example of a driving assistance device of an embodiment according to the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Configuration of Driving Assistance Device

A configuration example of a driving assistance device 100 of an embodiment according to the present invention will be described with reference to FIG. 1. FIG. 1 is a diagram illustrating a configuration example of a driving assistance device 100 of the present embodiment. The driving assistance device 100 is a device mounted on a self-vehicle in order to perform driving assistance for the self-vehicle. Although FIG. 1 illustrates components referred to in the following description, a vehicle on which the driving assistance device 100 is mounted may include other components for operating as the vehicle, such as a driving device and a transmission. Hereinafter, a four-wheeled vehicle will be described as an example of the vehicle on which the driving assistance device 100 is mounted, but the vehicle may be a two-wheeled vehicle or a vehicle of another type without being limited thereto. In addition, in the following description, in order to facilitate discrimination of vehicles, the vehicle on which the driving assistance device 100 is mounted may be referred to as a "self-vehicle", and vehicles different from the self-vehicle may be referred to as "other vehicles". Among other vehicles, a vehicle that currently is present around the self-vehicle may be referred to as a "peripheral vehicle". The peripheral vehicle may be understood as a vehicle that can currently perform vehicle-to-vehicle communication with the self-vehicle.

The driving assistance device 100 performs collision prevention assistance for preventing (reducing) collision with a peripheral vehicle as driving assistance for the self-vehicle without using map information. As illustrated in FIG. 1, the driving assistance device 100 of the present embodiment may include a sensor group 111, a global navigation satellite system (GNSS) antenna 112, a vehicle-to-vehicle communication antenna 113, a first display device 114, a second display device 115, an audio output device 116, a braking device 117, and a control device 120. Hereinafter, a driver of the self-vehicle may be simply referred to as the "driver".

The sensor group 111 includes various sensors mounted on the self-vehicle in order to perform driving assistance for the self-vehicle. For example, the sensor group 111 may include a speed sensor that detects the speed of the self-vehicle, an acceleration sensor that detects the acceleration of the self-vehicle, and the like. In addition, the sensor group 111 includes an external detection sensor, such as a camera, a millimeter wave radar, or a light detection and ranging (LIDAR), as an object detection unit that detects an object around the self-vehicle without using vehicle-to-vehicle communication. The sensor group 111 outputs the detection result to the control device 120.

The GNSS antenna 112 receives a radio wave for position measurement transmitted from a GNSS satellite. For example, the GNSS antenna 112 may be used to acquire information regarding the current position of the self-vehicle. The vehicle-to-vehicle communication antenna 113 is an antenna that transmits and receives various types of data to and from a peripheral vehicle. For example, the vehicle-to-vehicle communication antenna 113 may be used to acquire information regarding the current position, speed, and traveling trajectory of the peripheral vehicle from the peripheral vehicle.

The first display device 114 and the second display device 115 are devices that display information to an occupant (for example, the driver) of the self-vehicle. The first display device 114 and the second display device 115 may be provided at different locations in the interior of the self-vehicle. For example, the first display device 114 may be configured as a multi-information display (hereinafter, may be referred to as MID) provided on an instrument panel. The second display device 115 may be configured as a head-up display (hereinafter, may be referred to as HUD) projected on a windshield in front of the driver's seat. In addition, the audio output device 116 is a device that outputs audio to the occupant (for example, the driver) of the self-vehicle. When there is a possibility that the self-vehicle collides with a peripheral vehicle, the driving assistance device 100 of the present embodiment can notify the occupant of the self-vehicle of the possibility of collision with the peripheral vehicle, as driving assistance, through the first display device 114, the second display device 115, and/or the audio output device 116.

The braking device 117 is a device, such as a brake, for performing a braking operation of the self-vehicle. When there is a possibility that the self-vehicle collides with a peripheral vehicle, the driving assistance device 100 of the present embodiment can perform deceleration assistance for the self-vehicle by operating the braking device 117 as driving assistance, thereby avoiding collision with the peripheral vehicle.

The control device 120 is a device (computer) that controls driving assistance for the self-vehicle, and may be, for example, an electronic control unit (ECU). The control device 120 can perform driving assistance by vehicle-to-vehicle communication with other vehicles (peripheral vehicles) and processing in the self-vehicle. For example, the control device 120 can perform driving assistance without using map information. The control device 120 includes a processing unit 121, a storage unit 122, a GNSS module 123, and a vehicle-to-vehicle communication module 124, which are connected to each other by a bus (not illustrated).

The processing unit 121 is a processor represented by a central processing unit (CPU), and executes a program stored in the storage unit 122. The storage unit 122 includes, for example, a random access memory (RAM), a read only memory (ROM), a hard disk, and the like, and stores various types of data in addition to a program (driving assistance program) for the processing unit 121 to perform driving assistance processing of the self-vehicle. In addition, the GNSS module 123 receives position information and the like of the self-vehicle from the GNSS satellite through the GNSS antenna 112. The vehicle-to-vehicle communication module 124 receives various types of information from other vehicles through the vehicle-to-vehicle communication antenna 113.

The processing unit 121 of the present embodiment may include an acquisition unit 121*a*, a first prediction unit 121*b*, a second prediction unit 121*c*, a first display control unit 121*d*, a second display control unit 121*e*, and an audio control unit 121*f* in order to perform driving assistance (collision prevention assistance) of the self-vehicle. Note that the processing unit 121 is not limited to the configuration including the units 121*a* to 121*f*, and another unit may be added or some units may be omitted according to the type of driving assistance performed by the self-vehicle.

The acquisition unit 121*a* acquires peripheral vehicle information including the current position, speed, and traveling trajectory of a peripheral vehicle from the peripheral vehicle through the vehicle-to-vehicle communication antenna 113 (vehicle-to-vehicle communication module 124). In the following description, the peripheral vehicle information may be defined as information acquired from the peripheral vehicle by vehicle-to-vehicle communication. In addition, the acquisition unit 121*a* may also have a function of acquiring self-vehicle information including the current position, speed, and traveling trajectory of the self-vehicle through the sensor group 111 and the GNSS antenna 112 (GNSS module 123).

The first prediction unit 121*b* predicts a possibility of collision between the self-vehicle and the peripheral vehicle (hereinafter, may be referred to as the possibility of collision) based on the self-vehicle information and the peripheral vehicle information acquired by the acquisition unit 121*a*. The first prediction unit 121*b* of the present embodiment can predict the possibility of collision between the self-vehicle and the peripheral vehicle by calculating a time to collision (TTC) which is a time estimated to be required until the collision between the self-vehicle and the peripheral vehicle occurs.

The second prediction unit 121*c* predicts the possibility of collision between the self-vehicle and the peripheral vehicle based on the self-vehicle information acquired by the acquisition unit 121*a* and the detection result of the object detection unit of the sensor group 111. As described above, the object detection unit of the sensor group 111 may include the external detection sensor (camera, millimeter wave radar, LIDAR, or the like) that detects an object around the self-vehicle without using vehicle-to-vehicle communication. The detection result of the object detection unit may include the position and speed of the peripheral vehicle detected by the object detection unit (which may be understood as the relative position and relative speed of the peripheral vehicle with respect to the self-vehicle). The second prediction unit 121*c* of the present embodiment can predict the possibility of collision between the self-vehicle and the peripheral vehicle by calculating the time to collision (TTC) between the self-vehicle and the peripheral vehicle.

The first display control unit 121*d* controls display of information on the first display device 114. In the case of the present embodiment, when a state in which the first prediction unit 121*b* predicts that there is a possibility of collision between the self-vehicle and a peripheral vehicle and a start operation of the self-vehicle has been performed by the driver (hereinafter, may be referred to as a first state) is detected, the first display control unit 121*d* causes the first display device 114 to display attention-calling information for calling attention to approach of the peripheral vehicle. In addition, when a state in which the second prediction unit 121*c* predicts that there is the possibility of collision between the self-vehicle and the peripheral vehicle and the start operation of the self-vehicle has been performed by the driver (hereinafter, may be referred to as a third state) is detected, the first display control unit 121*d* causes the first display device 114 to display warning information for warning against approach of the peripheral vehicle.

Here, the attention-calling information is displayed on the first display device 114 for a predetermined display maintenance period (first period) from a timing at which the first state is detected. The display maintenance period may be arbitrarily set, and may be set to, for example, 6 seconds. The warning information is configured such that a degree of recognition of the driver (that is, a degree of warning to the driver) is higher than that of the attention-calling information. For example, the attention-calling information is displayed on the first display device 114 in a first light color (first color, for example, white). On the other hand, the warning information is displayed on the first display device 114 in a second light color (second color, for example, amber) which is different from the first light color and has a high degree of recognition of the driver. In addition, examples of the start operation of the self-vehicle by the driver include an operation of the driver releasing a brake pedal of the self-vehicle and an operation of the driver stepping on an accelerator pedal of the self-vehicle. In the present embodiment, the operation of the driver releasing the brake pedal of the self-vehicle (hereinafter, may be referred to as a brake release operation) will be described as an example of the start operation of the self-vehicle by the driver.

The second display control unit 121*e* controls display of information on the second display device 115. In the case of the present embodiment, when a state in which the first prediction unit 121*b* predicts that there is a possibility of collision between the self-vehicle and a peripheral vehicle (hereinafter, may be referred to as a second state) is detected, the second display control unit 121*e* causes the second display device 115 to display direction information indicating an approach direction of the peripheral vehicle. In addition, when a state in which the second prediction unit 121*c* predicts that there is the possibility of collision between the self-vehicle and the peripheral vehicle (hereinafter, may be referred to as a fourth state) is detected, the second display control unit 121*e* causes the second display device 115 to display direction information indicating an approach direction of the peripheral vehicle.

Here, the direction information displayed in response to the detection of the fourth state is configured such that a degree of recognition of the driver (that is, a degree of warning to the driver) is higher than that of the direction information displayed in response to the detection of the second state. For example, when the second state is detected, the direction information is displayed on the second display device 115 in the first light color (first color, for example, white). On the other hand, when the fourth state is detected, the direction information is displayed on the second display device 115 in the second light color (second color, for example, amber) which is different from the first light color and has a high degree of recognition of the driver.

The audio control unit 121*f* controls the audio output in the audio output device 116. In the case of the present embodiment, when the attention-calling information is displayed or updated by the first display device 114, the audio control unit 121*f* causes the audio output device 116 to output an attention-calling sound for calling attention to the approach of the peripheral vehicle. In addition, when the warning information is displayed by the first display device 114, the audio control unit 121*f* causes the audio output device 116 to output a warning sound for warning against the approach of the peripheral vehicle. Here, the warning sound is configured such that a degree of recognition of the driver (that is, a degree of warning to the driver) is higher than that of the attention-calling sound.

Figure 2:
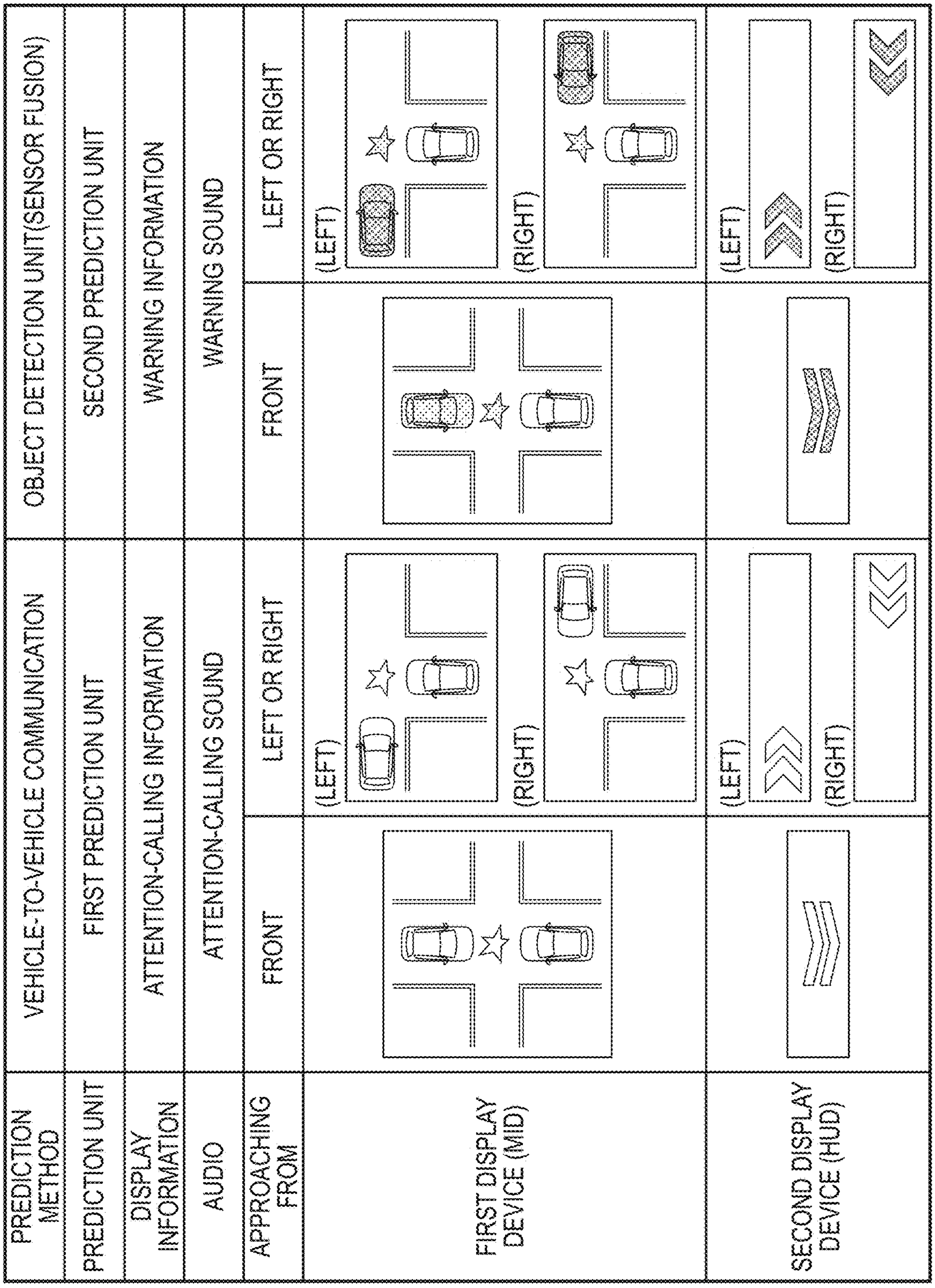
FIG. 2 is a view illustrating a display example of information in first and second display devices and an output example of audio in an audio output device.

FIG. 2 illustrates a display example of information in the first display device 114 and the second display device 115, and an output example of audio in the audio output device 116. In the present embodiment, a prediction method using vehicle-to-vehicle communication and a prediction method using the object detection unit (sensor fusion) of the sensor group 111 are applied as methods of predicting a possibility of collision between the self-vehicle and a peripheral vehicle.

In the prediction method using vehicle-to-vehicle communication, the first prediction unit 121*b* predicts a possibility of collision between the self-vehicle and a peripheral vehicle. Then, on the first display device 114 (MID), an image corresponding to an approach direction of the peripheral vehicle is displayed in the first light color (white) as the attention-calling information. On the second display device

115 (HUD), an image (arrow) corresponding to the approach direction of the peripheral vehicle is displayed in the first light color (white). In addition, an attention-calling sound is output from the audio output device 116.

On the other hand, in the prediction method using the object detection unit, the second prediction unit 121*c* predicts a possibility of collision between the self-vehicle and a peripheral vehicle. Then, on the first display device 114 (MID), an image corresponding to an approach direction of the peripheral vehicle is displayed in the second light color (amber) as the warning information. On the second display device 115 (HUD), an image (arrow) corresponding to the approach direction of the peripheral vehicle is displayed in the second light color (amber). In addition, the warning sound is output from the audio output device 116.

Here, the above-described function of the control device 120 can be implemented by both hardware and software. For example, the function of the control device 120 may be implemented by the processing unit 121 (CPU) executing the driving assistance program as described above, or may be implemented by a known semiconductor device such as a programmable logic device (PLD) or an application specific integrated circuit (ASIC). In the present embodiment, the control device 120 is illustrated as a single element, but may be divided into two or more elements as necessary.

Driving Assistance Processing

Figure 3:
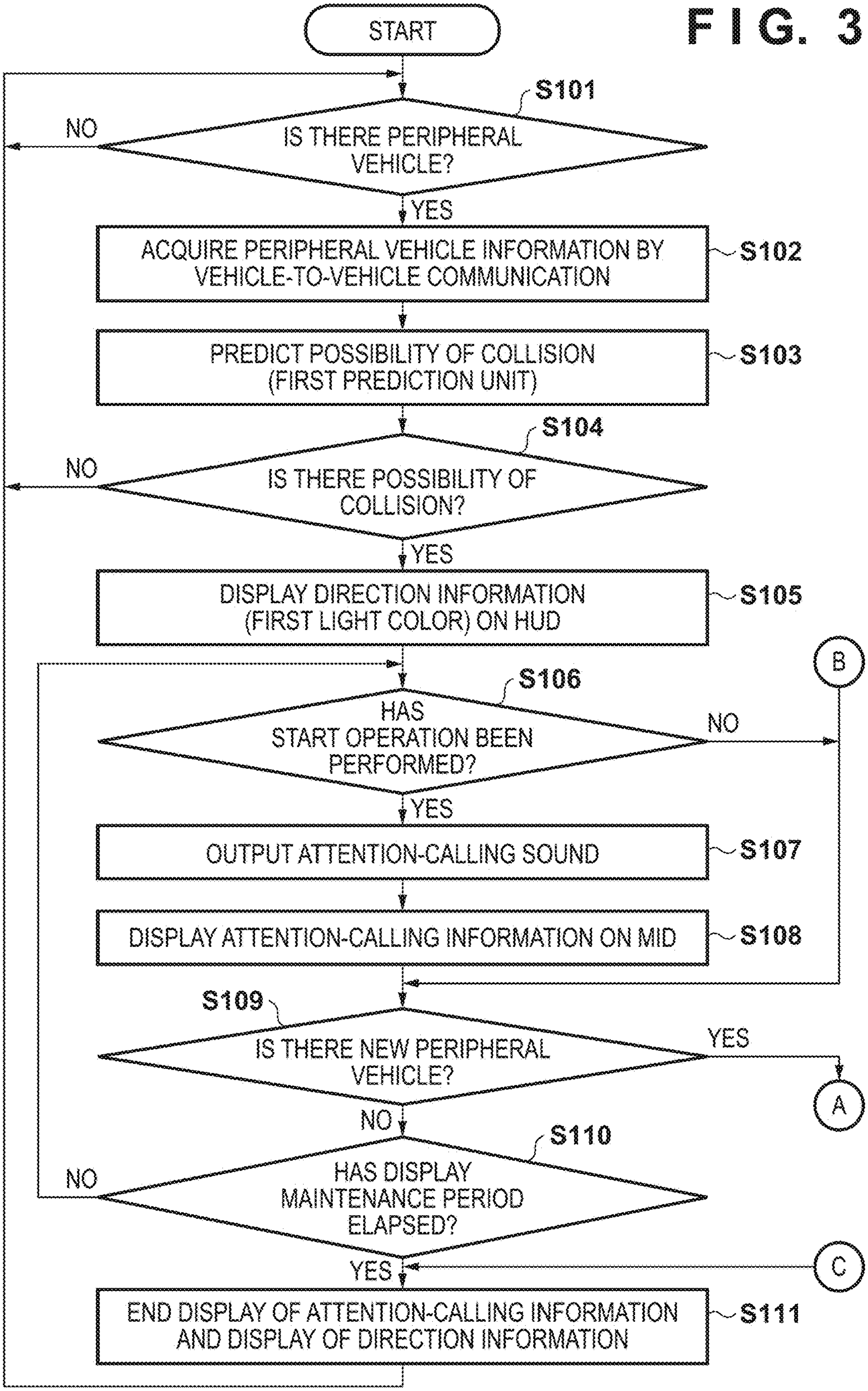
FIG. 3 is a flowchart illustrating driving assistance processing according to a prediction method using vehicle-to-vehicle communication.
Figure 4:
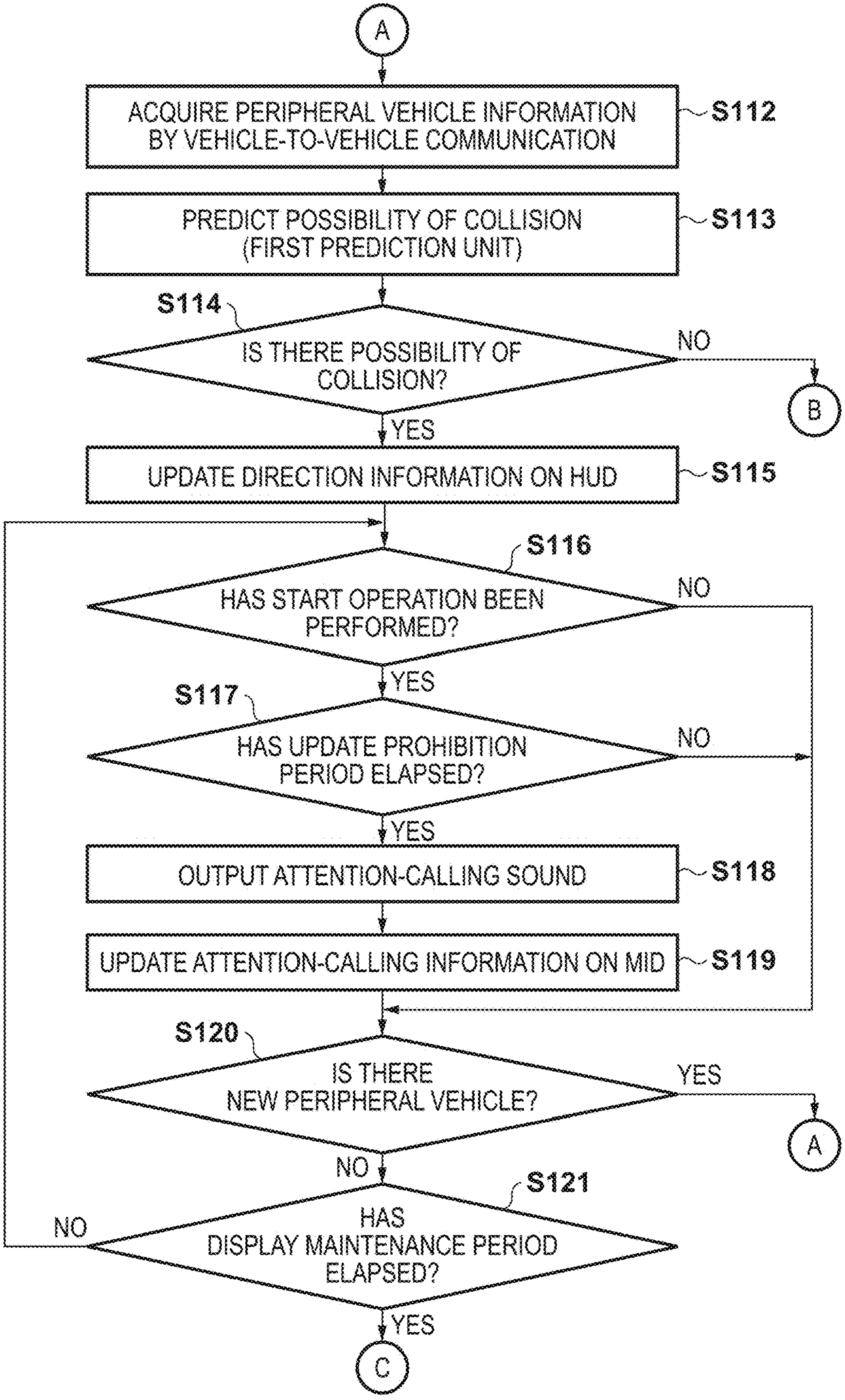
FIG. 4 is a flowchart illustrating the driving assistance processing according to the prediction method using the vehicle-to-vehicle communication.
Figure 5:
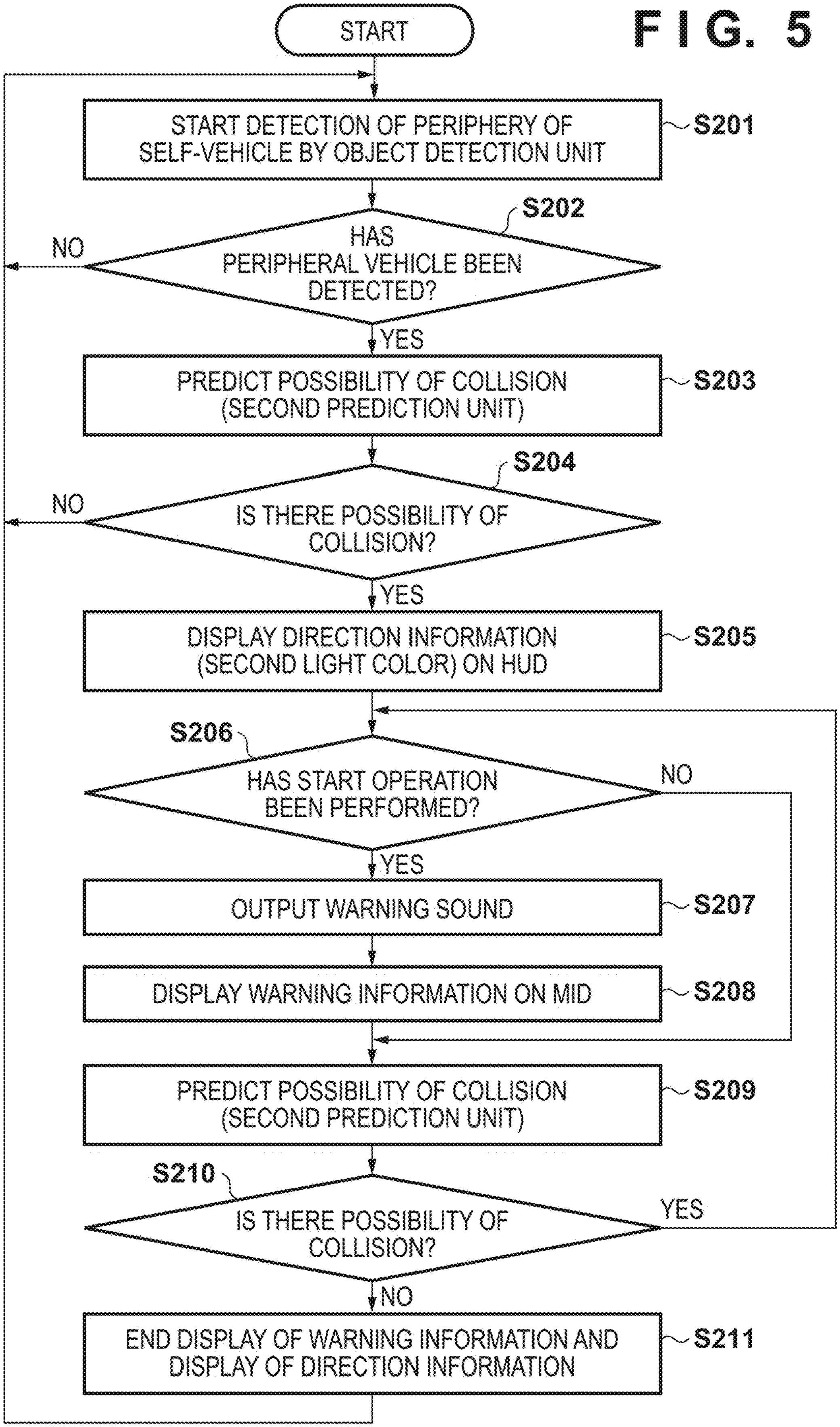
FIG. 5 is a flowchart illustrating driving assistance processing according to a prediction method using an object detection unit.

Driving assistance processing of the present embodiment will be described with reference to FIGS. 3 to 5. FIGS. 3 and 4 are flowcharts illustrating driving assistance processing according to the prediction method using vehicle-to-vehicle communication. FIG. 5 is a flowchart illustrating driving assistance processing according to the prediction method using the object detection unit (sensor fusion). The flowcharts of FIGS. 3 and 4 and the flowchart of FIG. 5 are performed in parallel and independently. In addition, the driving assistance processing illustrated in the flowcharts of FIGS. 3 to 5 is executed by the processing unit 121 in accordance with the driving assistance program read from the storage unit 122 in the driving assistance device 100. The flowcharts of FIGS. 3 to 5 may be repeatedly executed, for example, until the setting of driving assistance is turned off or the ignition of a self-vehicle SV is turned off.

First, the driving assistance processing according to the prediction method using vehicle-to-vehicle communication will be described with reference to FIGS. 3 and 4. FIG. 3 illustrates driving assistance processing for the first peripheral vehicle RV identified by vehicle-to-vehicle communication. FIG. 4 illustrates driving assistance processing for the second and subsequent peripheral vehicles RV (hereinafter, may be referred to as a new peripheral vehicle RV) identified by vehicle-to-vehicle communication during the driving assistance processing for the first peripheral vehicle RV.

In step S101, the processing unit 121 determines whether or not there is a peripheral vehicle RV. For example, the processing unit 121 can determine that the peripheral vehicle RV is present when vehicle-to-vehicle communication can be performed through the vehicle-to-vehicle communication antenna 113 (vehicle-to-vehicle communication module 124). When it is determined that there is no peripheral vehicle RV for which vehicle-to-vehicle communication can be performed, step S101 is repeated, and when it is determined that the peripheral vehicle RV is present, the processing proceeds to step S102.

In step S102, the processing unit 121 (acquisition unit 121*a*) acquires peripheral vehicle information from the peripheral vehicle RV by vehicle-to-vehicle communication. As described above, the peripheral vehicle information is information including the current position, speed, and traveling trajectory of the peripheral vehicle RV, and may be acquired through the vehicle-to-vehicle communication antenna 113 (vehicle-to-vehicle communication module 124). In addition, in this step S102, the processing unit 121 (acquisition unit 121*a*) can also acquire self-vehicle information including the current position, speed, and traveling trajectory of the self-vehicle SV through the sensor group 111 and the GNSS antenna 112 (GNSS module 123).

Figure 6A:
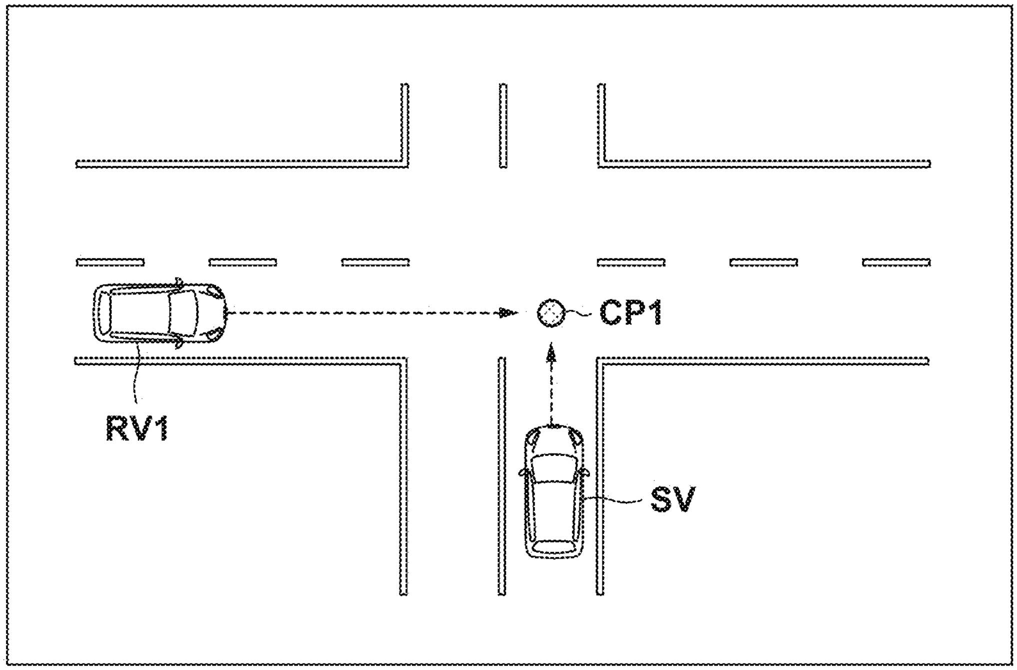
FIGS. 6A and 6B are views illustrating a positional relationship between a self-vehicle and peripheral vehicles.
Figure 6B:
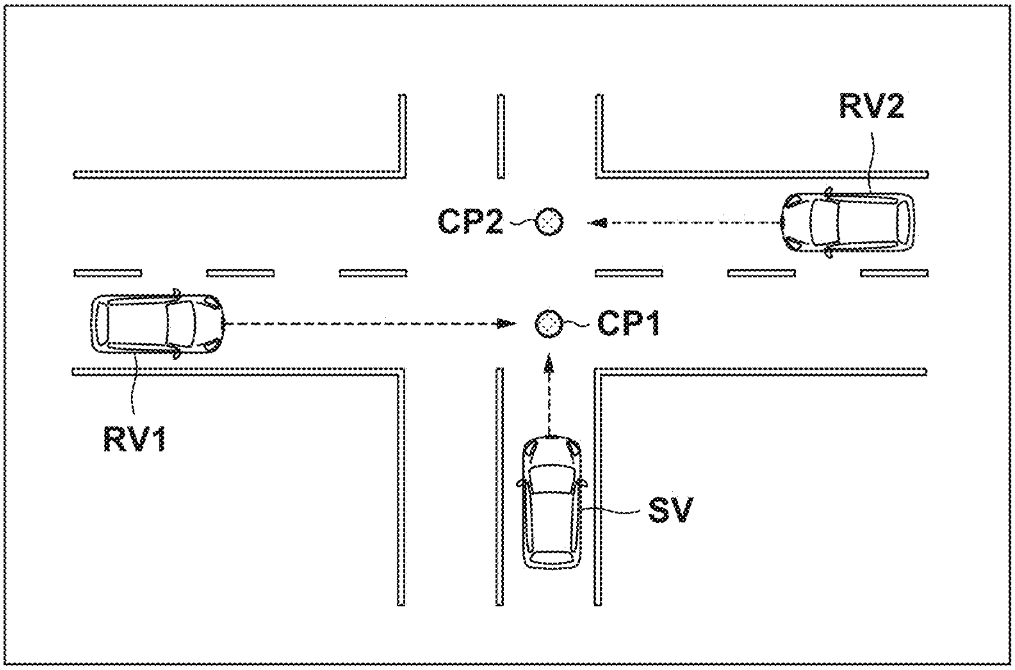

In step S103, the processing unit 121 (first prediction unit 121*b*) predicts a possibility of collision between the self-vehicle SV and the peripheral vehicle RV. As described above, the first prediction unit 121*b* of the present embodiment calculates a time to collision (TTC) between the self-vehicle SV and the peripheral vehicle RV to predict the possibility of collision between the self-vehicle SV and the peripheral vehicle RV. As an example, as illustrated in FIGS. 6A and 6B, the first prediction unit 121*b* obtains an intersection position (CP1, CP2) at which the self-vehicle SV and the peripheral vehicle RV (RV1, RV2) are estimated to intersect based on the self-vehicle information and the peripheral vehicle information, and calculates a time required for the peripheral vehicle RV to reach the intersection position as the time to collision. Then, the first prediction unit 121*b* can predict that there is the possibility of collision between the self-vehicle SV and the peripheral vehicle RV when the calculated time to collision is equal to or less than a first threshold. Here, the first threshold can be arbitrarily set. Note that FIG. 6A illustrates an example in which one peripheral vehicle RV1 is present around the self-vehicle SV, and FIG. 6B illustrates an example in which two peripheral vehicles RV1 and RV2 are present around the self-vehicle SV.

In step S104, the processing unit 121 determines whether or not there is a possibility of collision between the self-vehicle SV and the peripheral vehicle RV based on the prediction result in step S103. When where it is determined that there is no possibility of collision, the processing returns to step S101. On the other hand, when it is determined that there is the possibility of collision, the processing proceeds to step S105 assuming that the second state in which the possibility of collision between the self-vehicle SV and the peripheral vehicle RV is predicted is detected.

In step S105, the processing unit 121 (second display control unit 121*e*) causes the second display device 115 (HUD) to display direction information indicating an approach direction of the peripheral vehicle RV with respect to the self-vehicle SV in the first light color (white). As an example, the second display control unit 121*e* causes the second display device 115 to display an image (arrow) selected according to the approach direction of the peripheral vehicle RV, as the direction information, in the first light color as described above with reference to FIG. 2. The approach direction of the peripheral vehicle RV can be obtained based on the peripheral vehicle information.

In step S106, the processing unit 121 determines whether or not the brake release operation (start operation) has been performed by the driver. When the brake release operation has been performed, the processing proceeds to step S107 assuming that the first state in which the possibility of collision between the self-vehicle SV and the peripheral vehicle RV is predicted and the start operation has been performed by the driver is detected. On the other hand, when the brake release operation has not been performed, the processing proceeds to step S109.

In step S107, the processing unit 121 (audio control unit 121*f*) causes the audio output device 116 to output the attention-calling sound. Next, in step S108, the processing unit 121 (first display control unit 121*d*) causes the first display device 114 (MID) to display attention-calling information for calling attention to approach of the peripheral vehicle RV in the first light color (white). As an example, the first display control unit 121*d* causes the first display device 114 to display an image selected according to the approach direction of the peripheral vehicle RV, as the attention-calling information, in the first light color as described above with reference to FIG. 2.

In step S109, the processing unit 121 determines whether or not there is a new peripheral vehicle RV. For example, similarly to step S101 described above, the processing unit 121 can determine that the new peripheral vehicle RV is present when vehicle-to-vehicle communication can be performed through the vehicle-to-vehicle communication antenna 113 (vehicle-to-vehicle communication module 124). The processing proceeds to step S110 when it is determined that there is no new peripheral vehicle RV or proceeds to step S112 of FIG. 4 when it is determined that the new peripheral vehicle RV is present.

In step S110, the processing unit 121 determines whether or not the display maintenance period (first period) has elapsed. The display maintenance period is a period in which the display of the attention-calling information on the first display device 114 and the display of the direction information on the second display device 115 are maintained, and time measurement may be started from the timing at which the first state is detected. In the present embodiment, as an example, the display maintenance period is set to 6 seconds. When the display maintenance period has not elapsed, the processing returns to step S106. In this case, steps S106 to S108 may be skipped when steps S107 and S108 have already been performed. On the other hand, when the display maintenance period has elapsed, the processing proceeds to step S111, and the processing unit 121 ends the display of the attention-calling information on the first display device 114 and the display of the direction information on the second display device 115.

Proceeding to FIG. 4, in step S112, the processing unit 121 (acquisition unit 121*a*) acquires peripheral vehicle information from the new peripheral vehicle RV by vehicle-to-vehicle communication. Next, in step S113, the processing unit 121 (first prediction unit 121*b*) predicts a possibility of collision between the self-vehicle SV and the new peripheral vehicle RV. Since steps S112 and S113 are steps similar to steps S102 and S103 described above, and thus detailed description thereof will be omitted herein.

In step S114, the processing unit 121 determines whether or not there is a possibility of collision between the self-vehicle SV and the new peripheral vehicle RV based on the prediction result in step S113. When it is determined that there is no possibility of collision, the processing proceeds to step S109 in FIG. 3. The "new peripheral vehicle RV" in step S109 in this case does not necessarily include the peripheral vehicle RV for which the possibility of collision is predicted in steps S112 and S113 described above. On the other hand, when it is determined that there is the possibility of collision, the processing proceeds to step S115 assuming that the second state in which the possibility of collision between the self-vehicle SV and the peripheral vehicle RV is predicted is newly detected.

In step S115, the processing unit 121 (second display control unit 121*e*) updates the direction information displayed on the second display device 115 (HUD). For example, the second display control unit 121*e* updates the direction information by additionally displaying an approach direction of the peripheral vehicle RV based on the newly detected second state, that is, the approach direction of the new peripheral vehicle RV on the second display device 115 in the first light color (white). The second display control unit 121*e* may update the direction information by superimposing an image (arrow) selected according to the approach direction of the new peripheral vehicle RV on the second display device 115 in the first light color.

In step S116, the processing unit 121 determines whether or not the brake release operation (start operation) has been performed by the driver. When the brake release operation has been performed, the processing proceeds to step S117 assuming that the first state in which the possibility of collision between the self-vehicle SV and the peripheral vehicle RV is predicted and the start operation has been performed by the driver is newly detected. On the other hand, when the brake release operation has not been performed, the processing proceeds to step S120.

In step S117, the processing unit 121 determines whether or not an update prohibition period (second period) has elapsed. The processing proceeds to step S118 when the update prohibition period has elapsed or proceeds to step S120 when the update prohibition period has not elapsed.

The update prohibition period is a period in which update of the attention-calling information displayed on the first display device 114 is prohibited (suppressed), and time measurement may be started from the timing at which the first state is detected. The update prohibition period is set to a period shorter than the display maintenance period, and is set to 3 seconds as an example in the present embodiment. Since the update prohibition period is provided in this manner, the attention-calling information displayed on the first display device 114 is not updated in a certain period, and thus it is possible to reduce annoyance of the driver, such as update of the attention-calling information executed every time a possibility of collision with a new peripheral vehicle RV is predicted. Here, the direction information displayed on the second display device 115 is updated when the second state is newly detected even if the update prohibition period has not elapsed since only the approach direction of the new peripheral vehicle RV is additionally displayed using the arrow. Note that the update prohibition period may be understood as a re-notification prohibition period in which re-notification (re-display) of the attention-calling information is prohibited.

In step S118, the processing unit 121 (audio control unit 121*f*) causes the audio output device 116 to output the attention-calling sound. Next, in step S119, the processing unit 121 (first display control unit 121*d*) updates the attention-calling information displayed on the first display device 114 (MID). For example, the first display control unit 121*d* updates the attention-calling information by displaying attention-calling information for calling attention to the new peripheral vehicle RV on the first display device 114 in the first light color (white) in addition to or instead of the attention-calling information displayed on the first display device 114. That is, the first display control unit 121*d* causes the first display device 114 to perform interrupt display of the attention-calling information for calling attention to approach of the new peripheral vehicle RV in the first light color (white).

In step S120, the processing unit 121 determines whether or not there is a new peripheral vehicle RV. The "new peripheral vehicle RV" in step S120 does not necessarily include the peripheral vehicle RV for which the possibility of collision is predicted in steps S112 and S113 described above. When it is determined that there is no new peripheral vehicle RV, the processing proceeds to step S121 or proceeds to step S112 when the new peripheral vehicle RV is present. Since step S120 is a step similar to step S109 described above, and thus detailed description thereof will be omitted herein.

In step S121, the processing unit 121 determines whether or not the display maintenance period (first period) has elapsed. When the display maintenance period has not elapsed, the processing returns to step S116. In this case, steps S116 to S119 may be skipped when steps S118 and S119 have already been performed. On the other hand, when the display maintenance period has elapsed, the processing proceeds to step S111 of FIG. 3, and the processing unit 121 ends the display of the attention-calling information on the first display device 114 and the display of the direction information on the second display device 115. Note that the display of the attention-calling information and the display of the direction information corresponding thereto may be ended when the display maintenance period of the attention-calling information displayed on the first display device 114 (MID) in step S108 of FIG. 3 has elapsed while steps S116 to S119 are repeated. Since step S121 is a step similar to step S110 described above, and thus detailed description thereof will be omitted herein.

Next, the driving assistance processing according to the prediction method using the object detection unit will be described with reference to FIG. 5. As described above, the flowchart of FIG. 5 is performed in parallel and independently of the flowcharts of FIGS. 3 and 4.

In step S201, the processing unit 121 starts detection of the periphery of the self-vehicle SV by the object detection unit (sensor group 111). Next, in step S202, the processing unit 121 determines whether or not the peripheral vehicle RV has been detected by the object detection unit. The processing returns to step S201 when the peripheral vehicle RV has not been detected by the object detection unit or proceeds to step S203 when the peripheral vehicle RV has been detected by the object detection unit.

In step S203, the processing unit 121 (second prediction unit 121*c*) predicts a possibility of collision between the self-vehicle SV and the peripheral vehicle RV. As described above, the second prediction unit 121*c* of the present embodiment calculates a time to collision (TTC) between the self-vehicle SV and the peripheral vehicle RV to predict the possibility of collision between the self-vehicle SV and the peripheral vehicle RV. As an example, as illustrated in FIGS. 6A and 6B, the second prediction unit 121*c* obtains the intersection position (CP1, CP2) at which the self-vehicle SV and the peripheral vehicle RV (RV1, RV2) are estimated to intersect based on the self-vehicle information acquired by the acquisition unit 121*a* and the detection result of the object detection unit, and calculates a time required for the peripheral vehicle RV to reach the intersection position as the time to collision. Then, the second prediction unit 121*c* can predict that there is the possibility of collision between the self-vehicle SV and the peripheral vehicle RV when the calculated time to collision is equal to or less than a second threshold. Here, the second threshold is a value smaller than the first threshold, and can be arbitrarily set.

In step S204, the processing unit 121 determines whether or not there is a possibility of collision between the self-vehicle SV and the peripheral vehicle RV based on the prediction result in step S203. When it is determined that there is no possibility of collision, the processing returns to step S201. On the other hand, when it is determined that there is the possibility of collision, the processing proceeds to step S205 assuming that the fourth state in which the possibility of collision between the self-vehicle SV and the peripheral vehicle RV is predicted is detected.

In step S205, the processing unit 121 (second display control unit 121*e*) causes the second display device 115 (HUD) to display direction information indicating an approach direction of the peripheral vehicle RV with respect to the self-vehicle SV in the second light color (amber). As an example, the second display control unit 121*e* causes the second display device 115 to display an image (arrow) selected according to the approach direction of the peripheral vehicle RV, as the direction information, in the second light color as described above with reference to FIG. 2. The approach direction of the peripheral vehicle RV can be obtained based on the detection result of the object detection unit.

Here, there is a case where the direction information in the first light color is already displayed on the second display device 115 in the "driving assistance processing according to the prediction method using vehicle-to-vehicle communication" described above. In this case, the second display control unit 121*e* causes the second display device 115 to display the direction information indicating the approach direction of the peripheral vehicle RV determined to have the possibility of collision in step S204 in the second light color additionally (in a superimposed manner). That is, even in a case where the direction information in the first light color has already been displayed on the second display device 115, the second display control unit 121*e* causes the second display device 115 to perform interrupt display of the direction information indicating the approach direction of the peripheral vehicle RV determined to have the possibility of collision in step S204 in the second light color.

In step S206, the processing unit 121 determines whether or not the brake release operation (start operation) has been performed by the driver. When the brake release operation has been performed, the processing proceeds to step S207 assuming that the third state in which the possibility of collision between the self-vehicle SV and the peripheral vehicle RV is predicted and the start operation has been performed by the driver is detected. On the other hand, when the brake release operation has not been performed, the processing proceeds to step S209.

In step S207, the processing unit 121 (audio control unit 121*f*) causes the audio output device 116 to output the warning sound. Next, in step S208, the processing unit 121 (first display control unit 121*d*) causes the first display device 114 (MID) to display warning information for warning against the approach of the peripheral vehicle RV in the second light color (amber). As an example, the first display control unit 121*d* causes the first display device 114 to display an image selected according to the approach direction of the peripheral vehicle RV, as the warning information, in the second light color as described above with reference to FIG. 2.

Here, there is a case where the attention-calling information is already displayed on the first display device 114 in the "driving assistance processing according to the prediction method using vehicle-to-vehicle communication" described above. In this case, the first display control unit 121*d* causes the first display device 114 to display the warning information for warning against the approach of the peripheral vehicle RV determined to have the possibility of collision in step S204 instead of the attention-calling information. That is, the first display control unit 121*d* causes the first display device 114 to perform interrupt display of the warning information for warning against the approach of the peripheral vehicle RV in a case where it is determined in step S204 that there is the possibility of collision even if the attention-calling information is already displayed on the first display device 114 and the update prohibition period of the attention-calling information has not elapsed. In addition, the display of the warning information is not limited to the above example. For example, the processing unit 121 may display the warning information in a case where there is the possibility of collision even if a brake with a predetermined deceleration (for example, 0.8 G) or more is operated when the brake has not been stepped on.

In step S209, the processing unit 121 (second prediction unit 121*c*) predicts a possibility of collision between the self-vehicle SV and the peripheral vehicle RV. Similarly to step S203 described above, the second prediction unit 121*c* can calculate a time to collision (TTC) between the self-vehicle SV and the peripheral vehicle RV, and predict the possibility of collision between the self-vehicle SV and the peripheral vehicle RV based on whether or not the calculated time to collision is equal to or less than the second threshold.

In step S210, the processing unit 121 determines whether or not there is a possibility of collision between the self-vehicle SV and the peripheral vehicle RV based on the prediction result in step S209. When where it is determined that there is the possibility of collision, the processing returns to step S206. In this case, steps S206 to S208 may be skipped when steps S207 and S208 have already been performed. On the other hand, when it is determined that there is no possibility of collision, the processing proceeds to step S211.

In step S211, the processing unit 121 ends the display of the warning information on the first display device 114 and the display of the direction information on the second display device 115. That is, when the second prediction unit 121*c* determines that there is no possibility of collision, that is, when the second prediction unit 121*c* no longer calculates the time to collision (TTC), for example, when the self-vehicle SV and the peripheral vehicle RV has passed each other without collision, the processing unit 121 ends the display of the warning information and the direction information. Here, in a case where warning information is displayed on the first display device 114 instead of attention-calling information for the same peripheral vehicle RV, the attention-calling information is not displayed again even before a lapse of the display maintenance period of the attention-calling information.

Hereinafter, Examples 1 to 5 related to the driving assistance processing according to the present embodiment will be described. Although a case where the peripheral vehicle RV approaches from the left and/or right of the self-vehicle SV, as illustrated in FIGS. 6A and 6B, will be described as an example in each of Examples 1 to 5, the same applies to a case where the peripheral vehicle RV approaches from the front of the self-vehicle SV.

Example 1

Figure 7:
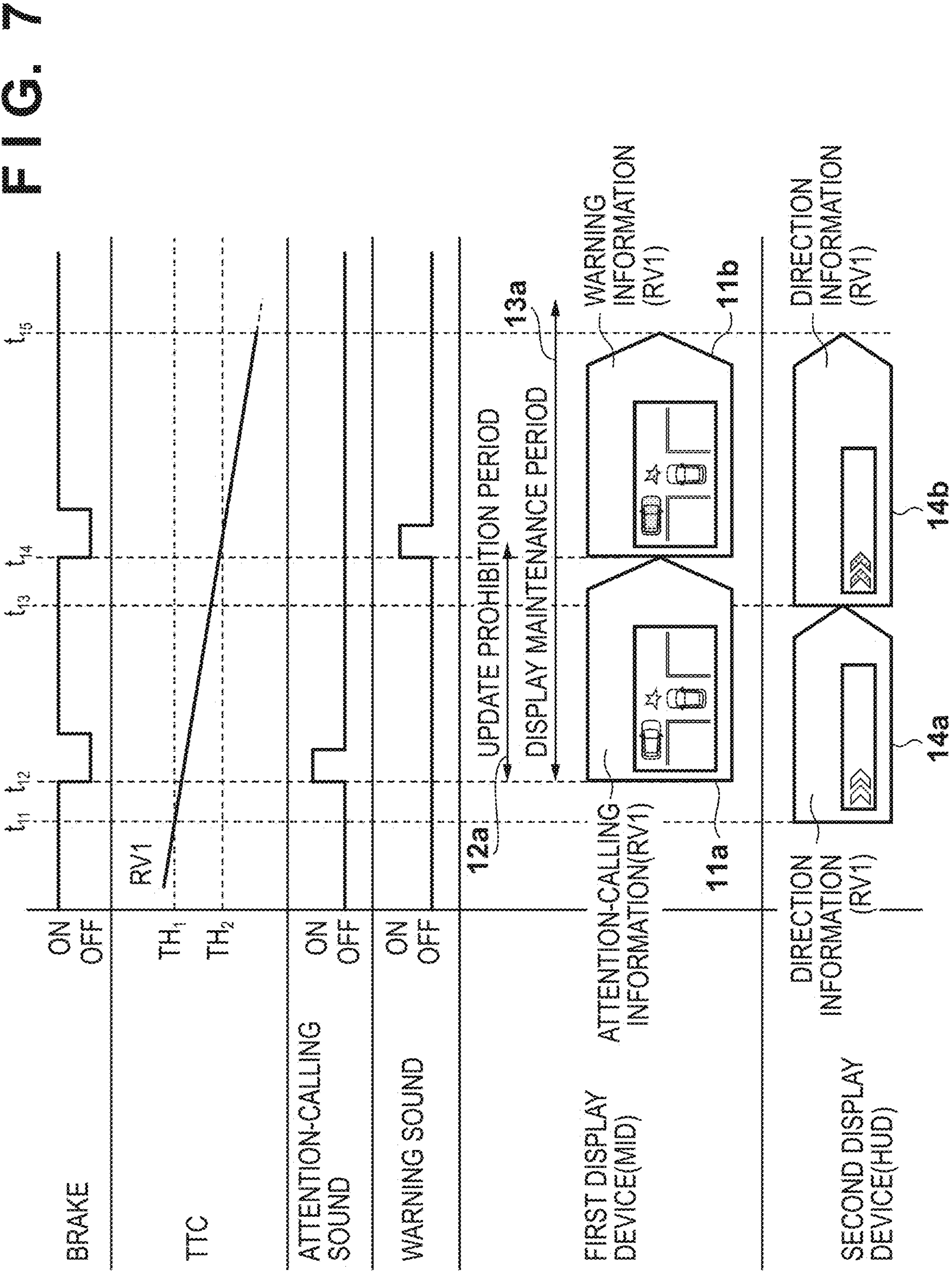
FIG. 7 is a time chart illustrating driving assistance processing of Example 1.

In Example 1, as illustrated in FIG. 6A, an example of driving assistance processing in a case where one peripheral vehicle RV1 approaches from the left of the self-vehicle SV will be described. FIG. 7 is a time chart illustrating the driving assistance processing of Example 1.

In Example 1, first, at timing $t_{11}$ at which a time to collision (TTC) calculated by the first prediction unit 121*b* for the peripheral vehicle RV1 reaches a first threshold $TH_1$, direction information 14*a* indicating an approach direction (left) of the peripheral vehicle RV1 is displayed on the second display device 115 (HUD) in the first light color (white). The timing $t_{11}$ may be understood as a timing at which the second state for the peripheral vehicle RV1 is detected. In addition, at timing $t_{12}$ at which the brake release operation (start operation) is performed by the driver, the attention-calling sound for calling attention to the approach of the peripheral vehicle RV1 is output from the audio output device 116, and attention-calling information 11*a* for calling attention to the approach of the peripheral vehicle RV1 is displayed on the first display device 114 (MID) in the first light color (white). Then, at the timing $t_{12}$, time measurement for an update prohibition period 12*a* and a display maintenance period 13*a* of the attention-calling information 11*a* is started. The timing $t_{12}$ may be understood as a timing at which the first state for the peripheral vehicle RV1 is detected.

Next, at timing $t_{13}$ at which a time to collision (TTC) calculated by the second prediction unit 121*c* for the peripheral vehicle RV1 reaches a second threshold $TH_2$, direction information 14*b* indicating the approach direction (left) of the peripheral vehicle RV1 is displayed on the second display device 115 (HUD) in the second light color (amber). The timing $t_{13}$ may be understood as a timing at which the fourth state for the peripheral vehicle RV1 is detected. In addition, at timing $t_{14}$ at which the brake release operation (start operation) is performed by the driver, the warning sound for warning against the approach of the peripheral vehicle RV1 is output from the audio output device 116, and warning information 11*b* for warning against the approach of the peripheral vehicle RV1 is displayed on the first display device 114 (MID) in the second light color (amber). The timing $t_{14}$ may be understood as a timing at which the third state for the peripheral vehicle RV1 is detected. The timing $t_{14}$ is before the update prohibition period 12*a* of the attention-calling information 11*a* elapses, but the warning information 11*b* is displayed on the first display device 114 in an interruptive manner, instead of the attention-calling information 11*a*, even before the update prohibition period 12*a* elapses.

The display of the warning information 11*b* on the first display device 114 and the display of the direction information 14*b* on the second display device 115 end at timing $t_{15}$ at which the second prediction unit 121*c* no longer calculates the time to collision. Although the timing tis is before the display maintenance period 13*a* of the attention-calling information 11*a* elapses, since the warning information 11*b* is displayed for the peripheral vehicle RV1 that is the same target as that of the attention-calling information 11*a*, the attention-calling information 11*a* is not displayed again.

Example 2

Figure 8:
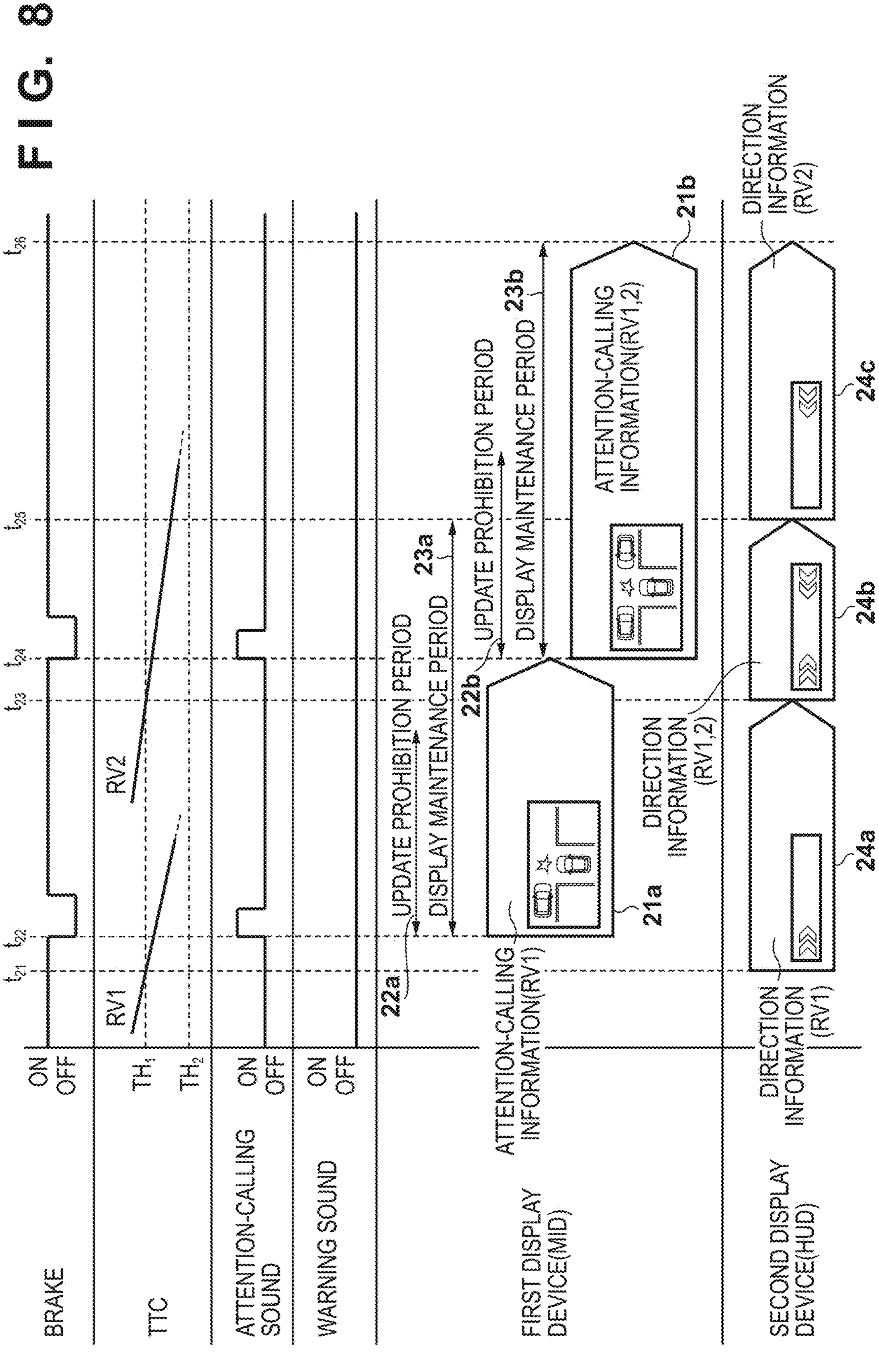
FIG. 8 is a time chart illustrating driving assistance processing of Example 2.

In Example 2, as illustrated in FIG. 6B, an example of driving assistance processing in a case where one peripheral vehicle RV1 approaches from the left of the self-vehicle SV and the other peripheral vehicle RV2 approaches from the right of the self-vehicle SV will be described. FIG. 8 is a time chart illustrating the driving assistance processing of Example 2.

In Example 2, first, at timing $t_{21}$ at which a time to collision (TTC) calculated by the first prediction unit 121*b* for the peripheral vehicle RV1 reaches the first threshold $TH_1$, direction information 24*a* indicating an approach direction (left) of the peripheral vehicle RV1 is displayed on the second display device 115 (HUD) in the first light color (white). The timing $t_{21}$ may be understood as a timing at which the second state for the peripheral vehicle RV1 is detected. In addition, at timing $t_{22}$ at which the brake release operation (start operation) is performed by the driver, the attention-calling sound for calling attention to the approach of the peripheral vehicle RV1 is output from the audio output device 116, and attention-calling information 21*a* for calling attention to the approach of the peripheral vehicle RV1 is displayed on the first display device 114 (MID) in the first light color (white). Then, at the timing $t_{22}$, time measurement for an update prohibition period 22*a* and a display maintenance period 23*a* of the attention-calling information 21*a* is started. The timing $t_{22}$ may be understood as a timing at which the first state for the peripheral vehicle RV1 is detected.

Next, at timing $t_{23}$ at which a time to collision (TTC) calculated by the first prediction unit 121*b* for the peripheral vehicle RV2 reaches the first threshold $TH_1$, direction information 24*b* in which an approach direction (right) of the peripheral vehicle RV2 is added is displayed on the second display device 115 (HUD) in the first light color (white). The timing $t_{23}$ may be understood as a timing at which a new second state for the peripheral vehicle RV2 is detected. In addition, timing $t_{24}$ at which the brake release operation (start operation) is performed by the driver is after a lapse of the update prohibition period 22*a* of the attention-calling information 21*a* for the peripheral vehicle RV1. Therefore, at the timing $t_{24}$, the attention-calling sound for calling attention to the approach of the peripheral vehicle RV2 is output from the audio output device 116, and attention-calling information 21*b* in which display for calling attention to the approach of the peripheral vehicle RV2 is added is displayed on the first display device 114 (MID) in the first light color (white), instead of the attention-calling information 21*a*. The attention-calling information 21*b* is information for calling attention to the approach of both the peripheral vehicles RV1 and RV2. Then, at the timing $t_{24}$, time measurement for an update prohibition period 22*b* and a display maintenance period 23*b* of the attention-calling information 21*b* is started. The timing $t_{24}$ may be understood as a timing at which a new first state for the peripheral vehicle RV2 is detected.

Next, at timing $t_{25}$ at which the display maintenance period 23*a* of the attention-calling information 21*a* for the peripheral vehicle RV1 has elapsed, the display indicating the approach direction of the peripheral vehicle RV1 ends, and direction information 24*c* indicating only the approach direction of the peripheral vehicle RV2 is displayed on the second display device 115. At the timing $t_{25}$, since the display maintenance period 23*b* has not elapsed, the display of the attention-calling information 21*b* on the first display device 114 is maintained. Then, at timing $t_{26}$ at which the display maintenance period 23*b* has elapsed, the display of the attention-calling information 21*b* on the first display device 114 and the display of the direction information 24*c* on the second display device 115 end.

Here, in Example 2, the attention-calling information 21*b* for calling attention to the approach of both the peripheral vehicles RV1 and RV2 is maintained even after the timing $t_{25}$ at which the display maintenance period 23*a* of the attention-calling information 21*a* for the peripheral vehicle RV1 has elapsed, but the present invention is not limited thereto. For example, at the timing $t_{25}$, the display for calling attention to the approach of the peripheral vehicle RV1 may be ended, and the attention-calling information may be updated to call attention only to the approach of the peripheral vehicle RV2. That is, the attention-calling information 21*b* for calling attention to the approach of both of the peripheral vehicles RV1 and RV2 may be displayed on the first display device 114 between the timings $t_{24}$ and $t_{25}$, and attention-calling information for calling attention only to the approach of the peripheral vehicle RV2 may be displayed on the first display device 114 between the timings $t_{25}$ and $t_{26}$.

Example 3

Figure 9:
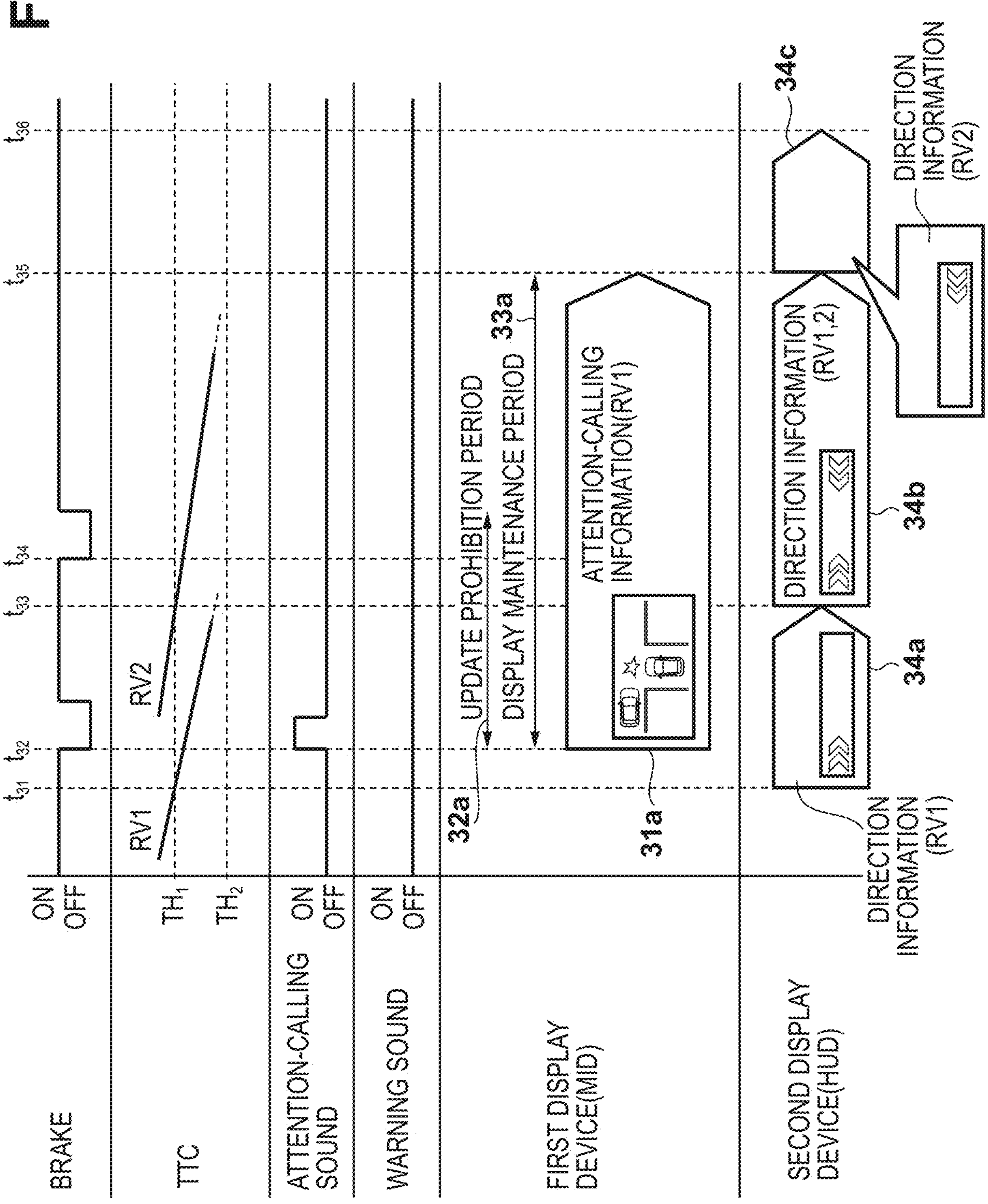
FIG. 9 is a time chart illustrating driving assistance processing of Example 3.

In Example 3, as illustrated in FIG. 6B, an example of driving assistance processing in a case where one peripheral vehicle RV1 approaches from the left of the self-vehicle SV and the other peripheral vehicle RV2 approaches from the right of the self-vehicle SV will be described. FIG. 9 is a time chart illustrating the driving assistance processing of Example 3.

In Example 3, first, at timing $t_{31}$ at which a time to collision (TTC) calculated by the first prediction unit 121*b* for the peripheral vehicle RV1 reaches a first threshold $TH_1$, direction information 34*a* indicating an approach direction (left) of the peripheral vehicle RV1 is displayed on the second display device 115 (HUD) in the first light color (white). The timing $t_{31}$ may be understood as a timing at which the second state for the peripheral vehicle RV1 is detected. In addition, at timing $t_{32}$ at which the brake release operation (start operation) is performed by the driver, the attention-calling sound for calling attention to the approach of the peripheral vehicle RV1 is output from the audio output device 116, and attention-calling information 31*a* for calling attention to the approach of the peripheral vehicle RV1 is displayed on the first display device 114 (MID) in the first light color (white). Then, at the timing $t_{32}$, time measurement for an update prohibition period 32*a* and a display maintenance period 33*a* of the attention-calling information 31*a* is started. The timing $t_{32}$ may be understood as a timing at which the first state for the peripheral vehicle RV1 is detected.

Next, at timing $t_{33}$ at which a time to collision (TTC) calculated by the first prediction unit 121*b* for the peripheral vehicle RV2 reaches the first threshold $TH_1$, direction information 34*b* in which an approach direction (right) of the peripheral vehicle RV2 is added is displayed on the second display device 115 (HUD) in the first light color (white). The timing $t_{33}$ may be understood as a timing at which a new second state for the peripheral vehicle RV2 is detected. Here, timing $t_{34}$ at which the brake release operation (start operation) is performed by the driver is a timing at which a new first state for the peripheral vehicle RV2 is detected, but the update prohibition period 32*a* of the attention-calling information 31*a* has not yet elapsed at the timing $t_{34}$. Therefore, output of the attention-calling sound for calling attention to the approach of the peripheral vehicle RV2 and update of the attention-calling information are not performed.

Next, at timing $t_{35}$ at which the display maintenance period 33*a* of the attention-calling information 31*a* for the peripheral vehicle RV1 has elapsed, the display of the attention-calling information 31*a* on the first display device 114 ends. At the timing $t_{35}$, the display indicating the approach direction of the peripheral vehicle RV1 ends, and direction information 34*c* indicating only the approach direction of the peripheral vehicle RV2 is displayed on the second display device 115. The display of the direction information 34*c* on the second display device 115 ends at timing $t_{36}$ at which the display maintenance period (for example, 6 seconds) has elapsed since the timing $t_{33}$ or the timing $t_{34}$ Example 4

Figure 10:
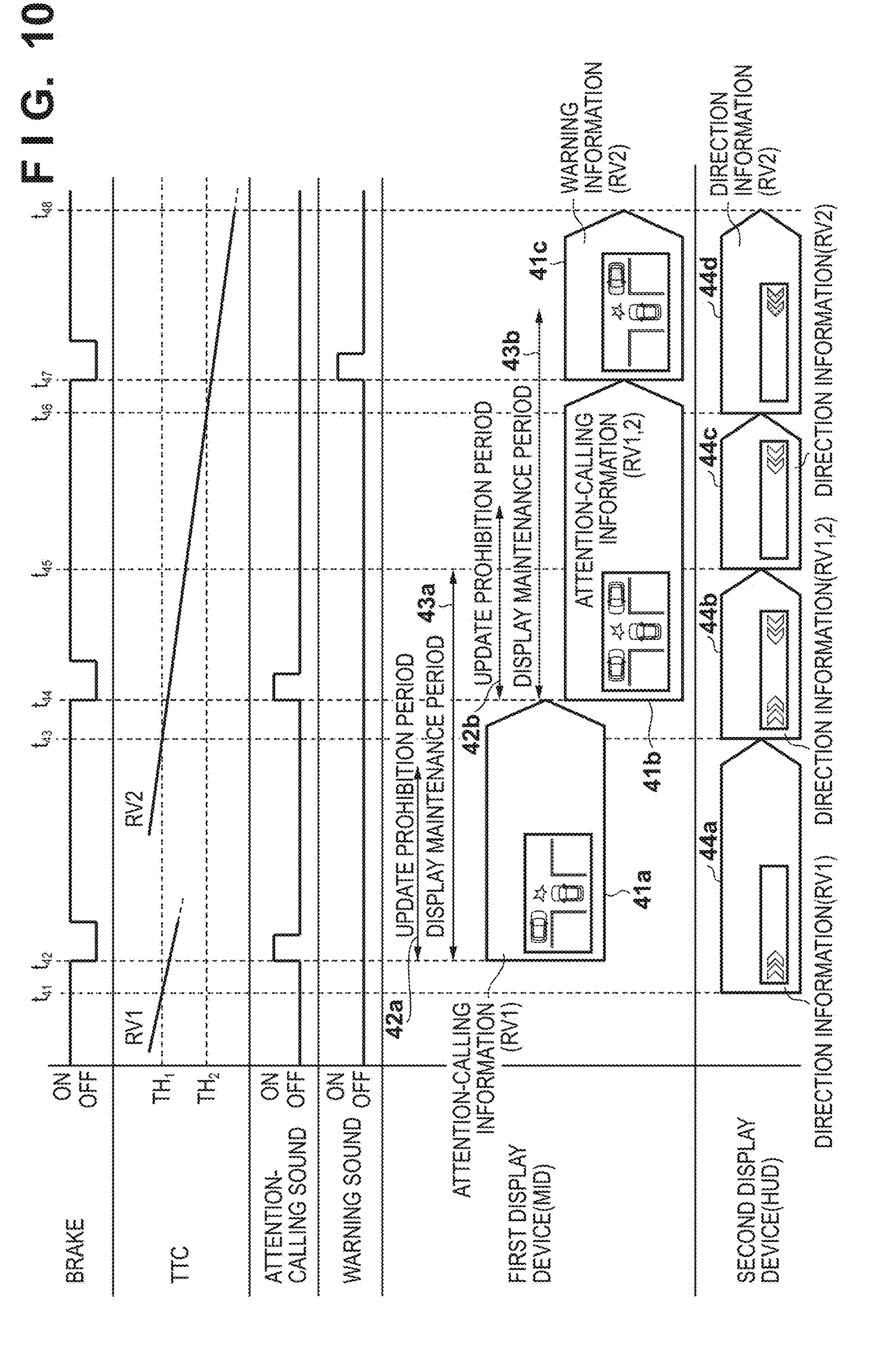
FIG. 10 is a time chart illustrating driving assistance processing of Example 4.

In Example 4, as illustrated in FIG. 6B, an example of driving assistance processing in a case where one peripheral vehicle RV1 approaches from the left of the self-vehicle SV and the other peripheral vehicle RV2 approaches from the right of the self-vehicle SV will be described. FIG. 10 is a time chart illustrating driving assistance processing of Example 4.

In Example 4, first, at timing $t_{41}$ at which a time to collision (TTC) calculated by the first prediction unit 121*b* for the peripheral vehicle RV1 reaches a first threshold $TH_1$, direction information 44*a* indicating an approach direction (left) of the peripheral vehicle RV1 is displayed on the second display device 115 (HUD) in the first light color (white). The timing $t_{41}$ may be understood as a timing at which the second state for the peripheral vehicle RV1 is detected. In addition, at timing $t_{42}$ at which the brake release operation (start operation) is performed by the driver, the attention-calling sound for calling attention to the approach of the peripheral vehicle RV1 is output from the audio output device 116, and attention-calling information 41*a* for calling attention to the approach of the peripheral vehicle RV1 is displayed on the first display device 114 (MID) in the first light color (white). Then, at the timing $t_{42}$, time measurement for an update prohibition period 42*a* and a display maintenance period 43*a* of the attention-calling information 41*a* is started. The timing $t_{42}$ may be understood as a timing at which the first state for the peripheral vehicle RV1 is detected.

Next, at timing $t_{43}$ at which a time to collision (TTC) calculated by the first prediction unit 121*b* for the peripheral vehicle RV2 reaches the first threshold $TH_1$, direction information 44*b* in which an approach direction (right) of the peripheral vehicle RV2 is added is displayed on the second display device 115 (HUD) in the first light color (white). The timing $t_{43}$ may be understood as a timing at which a new second state for the peripheral vehicle RV2 is detected. In addition, timing $t_{44}$ at which the brake release operation (start operation) is performed by the driver is after a lapse of the update prohibition period 42*a* of the attention-calling information 41*a* for the peripheral vehicle RV1. Therefore, at the timing $t_{44}$, the attention-calling sound for calling attention to the approach of the peripheral vehicle RV2 is output from the audio output device 116, and attention-calling information 41*b* in which display for calling attention to the approach of the peripheral vehicle RV2 is added is displayed on the first display device 114 (MID) in the first light color (white), instead of the attention-calling information 41*a*. The attention-calling information 41*b* is information for calling attention to the approach of both the peripheral vehicles RV1 and RV2. Then, at the timing $t_{44}$, time measurement for an update prohibition period 42*b* and a display maintenance period 43*b* of the attention-calling information 41*b* is started. The timing $t_{44}$ may be understood as a timing at which a new first state for the peripheral vehicle RV2 is detected.

Next, at timing $t_{45}$ at which the display maintenance period 43*a* of the attention-calling information 41*a* for the peripheral vehicle RV1 has elapsed, the display indicating the approach direction of the peripheral vehicle RV1 ends, and direction information 44*c* indicating only the approach direction of the peripheral vehicle RV2 is displayed on the second display device 115. At the timing $t_{45}$, since the display maintenance period 43*b* has not elapsed, the display of the attention-calling information 41*b* on the first display device 114 is maintained.

Next, at timing $t_{46}$ at which a time to collision (TTC) calculated by the second prediction unit 121*c* for the peripheral vehicle RV2 reaches the second threshold $TH_2$, direction information 44*d* indicating the approach direction (right) of the peripheral vehicle RV2 is displayed on the second display device 115 (HUD) in the second light color (amber). The timing $t_{46}$ may be understood as a timing at which the fourth state for the peripheral vehicle RV2 is detected. In addition, at timing $t_{47}$ at which the brake release operation (start operation) is performed by the driver, the warning sound for warning against the approach of the peripheral vehicle RV2 is output from the audio output device 116, and warning information 41*c* for warning against the approach of the peripheral vehicle RV2 is displayed on the first display device 114 (MID) in the second light color (amber), instead of the attention-calling information 41*b*. That is, the warning information 41*c* is displayed on the first display device 114 in an interruptive manner, instead of the attention-calling information 41*b*. The timing $t_{47}$ may be understood as a timing at which the third state for the peripheral vehicle RV2 is detected.

The display of the warning information 41*c* on the first display device 114 is continuously performed even after a lapse of the display maintenance period 43*b* of the attention-calling information 41*b*, and ends at timing $t_{48}$ at which the second prediction unit 121*c* no longer calculates the time to collision. Accordingly, the display of the direction information 44*d* on the second display device 115 also ends at the timing $t_{48}$.

Here, the attention-calling information 41*b* for calling attention to the approach of both the peripheral vehicles RV1 and RV2 is maintained even after the timing $t_{45}$ at which the display maintenance period 43*a* of the attention-calling information 41*a* for the peripheral vehicle RV1 has elapsed in Example 4, but the present invention is not limited thereto. For example, at the timing $t_{45}$, the display for calling attention to the approach of the peripheral vehicle RV1 may be ended, and the attention-calling information may be updated to call attention only to the approach of the peripheral vehicle RV2. That is, the attention-calling information 41*b* for calling attention to the approach of both of the peripheral vehicles RV1 and RV2 may be displayed on the first display device 114 between the timings $t_{44}$ and $t_{45}$, and attention-calling information for calling attention only to the approach of the peripheral vehicle RV2 may be displayed on the first display device 114 between the timings $t_{45}$ and $t_{47}$.

Example 5

Figure 11:
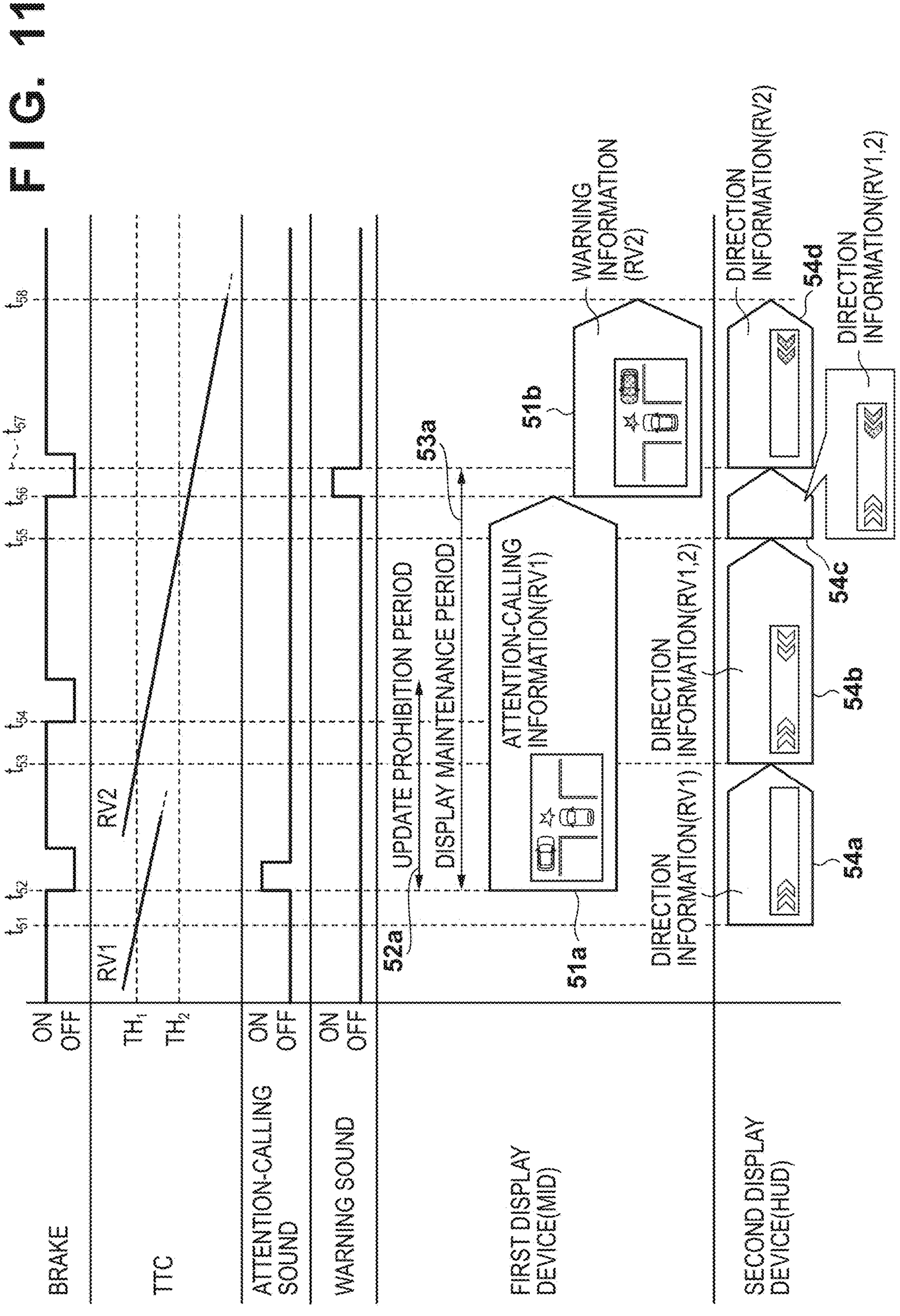
FIG. 11 is a time chart illustrating driving assistance processing of Example 5.

In Example 5, as illustrated in FIG. 6B, an example of driving assistance processing in a case where one peripheral vehicle RV1 approaches from the left of the self-vehicle SV and the other peripheral vehicle RV2 approaches from the right of the self-vehicle SV will be described. FIG. 11 is a time chart illustrating driving assistance processing of Example 5.

In Example 5, first, at timing $t_{51}$ at which a time to collision (TTC) calculated by the first prediction unit 121*b* for the peripheral vehicle RV1 reaches a first threshold $TH_1$, direction information 54*a* indicating an approach direction (left) of the peripheral vehicle RV1 is displayed on the second display device 115 (HUD) in the first light color (white). The timing $t_{51}$ may be understood as a timing at which the second state for the peripheral vehicle RV1 is detected. In addition, at timing $t_{52}$ at which the brake release operation (start operation) is performed by the driver, the attention-calling sound for calling attention to the approach of the peripheral vehicle RV1 is output from the audio output device 116, and attention-calling information 51*a* for calling attention to the approach of the peripheral vehicle RV1 is displayed on the first display device 114 (MID) in the first light color (white). Then, at the timing $t_{52}$, time measurement for an update prohibition period 52*a* and a display maintenance period 53*a* of the attention-calling information 51*a* is started. The timing $t_{52}$ may be understood as a timing at which the first state for the peripheral vehicle RV1 is detected.

Next, at timing $t_{53}$ at which a time to collision (TTC) calculated by the first prediction unit 121*b* for the peripheral vehicle RV2 reaches the first threshold $TH_1$, direction information 54*b* in which an approach direction (right) of the peripheral vehicle RV2 is added is displayed on the second display device 115 (HUD) in the first light color (white). The timing $t_{53}$ may be understood as a timing at which a new second state for the peripheral vehicle RV2 is detected. Here, timing $t_{54}$ at which the brake release operation (start operation) is performed by the driver is a timing at which a new first state for the peripheral vehicle RV2 is detected, but the update prohibition period 52*a* of the attention-calling information 51*a* has not yet elapsed at the timing $t_{54}$. Therefore, output of the attention-calling sound for calling attention to the approach of the peripheral vehicle RV2 and update of the attention-calling information are not performed.

Next, at timing $t_{55}$ at which a time to collision (TTC) calculated by the second prediction unit 121*c* for the peripheral vehicle RV2 reaches the second threshold $TH_2$, direction information 54*c* in which the approach direction of the peripheral vehicle RV1 is maintained in the first light color and the approach direction of the peripheral vehicle RV2 is changed to the second light color (amber) is displayed on the second display device 115 (HUD). The timing $t_{55}$ may be understood as a timing at which the fourth state for the peripheral vehicle RV2 is detected.

At timing $t_{56}$ at which the brake release operation (start operation) is performed by the driver, the warning sound for warning against the approach of the peripheral vehicle RV2 is output from the audio output device 116, and warning information 51*b* for warning against the approach of the peripheral vehicle RV2 is displayed on the first display device 114 (MID) in the second light color (amber), instead of the attention-calling information 51*a*. That is, the warning information 51*b* for warning against the approach of the peripheral vehicle RV2 is displayed on the first display device 114 in an interruptive manner, instead of the attention-calling information 51*a*. The timing $t_{56}$ may be understood as a timing at which the third state for the peripheral vehicle RV2 is detected.

Next, at timing $t_{57}$ at which the display maintenance period 53*a* of the attention-calling information 51*a* for the peripheral vehicle RV1 has elapsed, the display indicating the approach direction of the peripheral vehicle RV1 ends, and direction information 54*d* indicating only the approach direction of the peripheral vehicle RV2 is displayed on the second display device 115 in the second light color.

The display of the warning information 51*b* on the first display device 114 ends at timing $t_{58}$ at which the second prediction unit 121*c* no longer calculates the time to collision. Accordingly, the display of the direction information 54*d* on the second display device 115 also ends at the timing $t_{58}$.

Here, the warning information 51*b* for warning only the approach of the peripheral vehicle RV2 is displayed on the first display device 114, instead of the attention-calling information 51*a*, at the timing $t_{56}$ in Example 5, but the present invention is not limited thereto. For example, since the timing $t_{54}$ is before a lapse of the display maintenance period 53*a* of the attention-calling information 51*a* for calling attention to the approach of the peripheral vehicle RV1, the attention-calling information 51*a* may be displayed until the timing $t_{57}$ at which the display maintenance period 53*a* ends. That is, between the timings $t_{56}$ and $t_{57}$, the attention-calling information 51*a* for calling attention to the approach of the peripheral vehicle RV1 and the warning information 51*b* for warning against the approach of the peripheral vehicle RV2 may be displayed on the first display device 114 in a superimposed manner. Then, the display of the attention-calling information 51*a* may be ended at the timing $t_{57}$, and only the warning information 51*b* for warning against the approach of the peripheral vehicle RV2 may be displayed on the first display device 114 after the timing $t_{57}$.

As described above, in the driving assistance device 100 of the present embodiment, the update of the attention-calling information is suppressed (prohibited) until the update prohibition period (second period) elapses from the timing at which the first state is detected and the attention-calling information is displayed on the first display device 114 (MID) even in a case where the first state is newly detected. As a result, it is possible to reduce the annoyance of the driver, such as update of the attention-calling information executed every time a new first state is detected. On the other hand, the direction information displayed on the second display device 115 (HUD) after the second state is detected is updated when the second state is newly detected even if the update prohibition period has not elapsed from the timing. As a result, it is possible to cause the driver to grasp the approach direction of the peripheral vehicle predicted to have the possibility of collision with the self-vehicle. That is, it is possible to cause the driver to appropriately grasp information while reducing the annoyance of the driver according to the present embodiment.

Summary of Embodiment (Item 1)

A driving assistance device (e.g. 100) configured to perform driving assistance for a self-vehicle (e.g. SV), comprising:

- an acquisition unit (e.g. 113, 124, 121*a*) configured to acquire peripheral vehicle information including a current position, a speed, and a traveling trajectory of a peripheral vehicle (e.g. RV) present around the self-vehicle, from the peripheral vehicle by vehicle-to-vehicle communication;
- a first prediction unit (e.g. 121*b*) configured to predict a collision possibility between the self-vehicle and the peripheral vehicle based on self-vehicle information including a current position, a speed, and a traveling trajectory of the self-vehicle and the peripheral vehicle information acquired by the acquisition unit;
- a first display unit (e.g. 114, 121*d*) configured to, when a first state is detected, display attention-calling information for calling attention to approach of the peripheral vehicle in a first period from a timing at which the first state is detected, the first state being a state in which the collision possibility is predicted by the first prediction unit and a start operation is performed by a driver of the self-vehicle; and a second display unit (e.g. 115, 121*e*) configured to, when a second state is detected, display direction information indicating an approach direction of the peripheral vehicle, the second state being a state in which the collision possibility is predicted by the first prediction unit, wherein the first display unit suppresses update of the attention-calling information until a second period shorter than the first period elapses from the timing even in a case where the first state is newly detected, and wherein the second display unit updates the direction information when the second state is newly detected even in a case where the second period has not elapsed from the timing.

According to this item, it is possible to reduce the annoyance of the driver such as update of the attention-calling information executed every time a new first state is detected. In addition, since the direction information is updated when a new second state is detected, it is possible to cause the driver to grasp the approach direction of the peripheral vehicle predicted to have the possibility of collision with the self-vehicle. That is, it is possible to cause the driver to appropriately grasp information while reducing the annoyance of the driver, and driving assistance can be appropriately performed.

(Item 2)

The driving assistance device according to item 1, wherein the first display unit does not update the attention-calling information, when the first state is newly detected before the second period elapses from the timing.

According to this item, even in a case where the first state is newly detected before the second period elapses for the attention-calling information displayed on the first display unit, it is possible to reduce the annoyance of the driver.

(Item 3)

The driving assistance device according to item 1 or 2, wherein the second display unit updates the direction information by additionally displaying the approach direction of the peripheral vehicle when the second state is newly detected before the second period elapses from the timing.

According to this item, it is possible to cause the driver to appropriately grasp the approach direction of the peripheral vehicle predicted to have the possibility of collision with the self-vehicle while reducing the annoyance of the driver.

(Item 4)

The driving assistance device according to any one of items 1 to 3, wherein the second display unit ends the display of the direction information when the display of the attention-calling information by the first display unit is ended.

According to this item, it is possible to cause the driver to appropriately grasp information while reducing the annoyance of the driver, and driving assistance can be appropriately performed.

(Item 5)

The driving assistance device according to any one of items 1 to 4, further comprising:

an object detector (e.g. 111) configured to detect an object around the self-vehicle without using vehicle-to-vehicle communication; and a second prediction unit (e.g. 121*c*) configured to predict the collision possibility between the self-vehicle and the peripheral vehicle based on the self-vehicle information and a detection result of the object detector, wherein the first display unit displays warning information for warning against the approach of the peripheral vehicle when a third state is detected, the third state being a state in which the collision possibility is predicted by the second prediction unit and the start operation is performed by the driver of the self-vehicle.

According to this item, it is possible to cause the driver to appropriately grasp the possibility of collision with the peripheral vehicle predicted using the object detector (sensor fusion).

(Item 6)

The driving assistance device according to item 5, wherein the first display unit displays the warning information, instead of the attention-calling information, when the third state is detected even in a case where the second period does not elapse from the timing.

According to this item, even in a case where the possibility of collision with the peripheral vehicle predicted using the vehicle-to-vehicle communication is displayed as the attention-calling information, it is possible to cause the driver to immediately grasp the possibility of collision with the peripheral vehicle predicted using the object detector (sensor fusion) as the warning information.

(Item 7)

The driving assistance device according to item 5 or 6, wherein the second display unit displays the direction information in a first color when the second state is detected, and displays the direction information in a second color different from the first color when a fourth state is detected, the fourth state being a state in which the collision possibility is predicted by the second prediction unit.

According to this item, it is possible to cause the driver to appropriately grasp the approach direction of the peripheral vehicle obtained using the object detector (sensor fusion).

(Item 8)

The driving assistance device according to any one of items 5 to 7, wherein the first prediction unit calculates a time to collision between the self-vehicle and the peripheral vehicle based on the self-vehicle information and the peripheral vehicle information, and predicts that there is the collision possibility when the time to collision is equal to or less than a first threshold (e.g. $TH_1$), and wherein the second prediction unit calculates the time to collision based on the self-vehicle information and the detection result of the object detector, and predicts that there is the collision possibility when the time to collision is equal to or less than a second threshold (e.g. $TH_2$) smaller than the first threshold.

According to this item, the prediction of the possibility of collision using the vehicle-to-vehicle communication and the prediction of the possibility of collision using the object detector (sensor fusion) can be appropriately performed.

(Item 9)

The driving assistance device according to any one of items 5 to 8, further comprising an audio output unit (e.g. 116, 121*f*) configured to output audio, wherein the audio output unit outputs an attention-calling sound for calling attention to the approach of the peripheral vehicle when the attention-calling information is displayed or updated by the first display unit, and outputs a warning sound for warning against the approach of the peripheral vehicle when the warning information is displayed by the first display unit, and wherein the attention-calling sound and the warning sound are different from each other.

According to this item, it is possible to appropriately notify the driver of the attention-calling information and/or the warning information by audio.

The invention is not limited to the foregoing embodiments, and various variations/changes are possible within the spirit of the invention.

What is claimed is:

1. A driving assistance device configured to perform driving assistance for a self-vehicle, comprising:

an acquisition unit configured to acquire peripheral vehicle information including a current position, a speed, and a traveling trajectory of a peripheral vehicle present around the self-vehicle, from the peripheral vehicle by vehicle-to-vehicle communication;

a first prediction unit configured to predict a collision possibility between the self-vehicle and the peripheral vehicle based on self-vehicle information including a current position, a speed, and a traveling trajectory of the self-vehicle and the peripheral vehicle information acquired by the acquisition unit;

a first display unit configured to, when a first state is detected, display attention-calling information for calling attention to approach of the peripheral vehicle in a first period from a timing at which the first state is detected, the first state being a state in which the collision possibility is predicted by the first prediction unit and a start operation is performed by a driver of the self-vehicle; and a second display unit configured to, when a second state is detected, display direction information indicating an approach direction of the peripheral vehicle, the second state being a state in which the collision possibility is predicted by the first prediction unit, wherein the first display unit suppresses update of the attention-calling information until a second period shorter than the first period elapses from the timing even in a case where the first state is newly detected, and wherein the second display unit updates the direction information when the second state is newly detected even in a case where the second period has not elapsed from the timing.

2. The driving assistance device according to claim 1, wherein the first display unit does not update the attention-calling information, when the first state is newly detected before the second period elapses from the timing.

3. The driving assistance device according to claim 1, wherein the second display unit updates the direction information by additionally displaying the approach direction of the peripheral vehicle when the second state is newly detected before the second period elapses from the timing.

4. The driving assistance device according to claim 1, wherein the second display unit ends the display of the direction information when the display of the attention-calling information by the first display unit is ended.

5. The driving assistance device according to claim 1, further comprising:

an object detector configured to detect an object around the self-vehicle without using vehicle-to-vehicle communication; and a second prediction unit configured to predict the collision possibility between the self-vehicle and the peripheral vehicle based on the self-vehicle information and a detection result of the object detector, wherein the first display unit displays warning information for warning against the approach of the peripheral vehicle when a third state is detected, the third state being a state in which the collision possibility is predicted by the second prediction unit and the start operation is performed by the driver of the self-vehicle.

6. The driving assistance device according to claim 5, wherein the first display unit displays the warning information, instead of the attention-calling information, when the third state is detected even in a case where the second period does not elapse from the timing.

7. The driving assistance device according to claim 5, wherein the second display unit displays the direction information in a first color when the second state is detected, and displays the direction information in a second color different from the first color when a fourth state is detected, the fourth state being a state in which the collision possibility is predicted by the second prediction unit.

8. The driving assistance device according to claim 5, wherein the first prediction unit calculates a time to collision between the self-vehicle and the peripheral vehicle based on the self-vehicle information and the peripheral vehicle information, and predicts that there is the collision possibility when the time to collision is equal to or less than a first threshold, and wherein the second prediction unit calculates the time to collision based on the self-vehicle information and the detection result of the object detector, and predicts that there is the collision possibility when the time to collision is equal to or less than a second threshold smaller than the first threshold.

9. The driving assistance device according to claim 5, further comprising an audio output unit configured to output audio, wherein the audio output unit outputs an attention-calling sound for calling attention to the approach of the peripheral vehicle when the attention-calling information is displayed or updated by the first display unit, and outputs a warning sound for warning against the approach of the peripheral vehicle when the warning information is displayed by the first display unit, and wherein the attention-calling sound and the warning sound are different from each other.

10. A driving assistance method of performing driving assistance for a self-vehicle, comprising:

acquiring peripheral vehicle information including a current position, a speed, and a traveling trajectory of a peripheral vehicle present around the self-vehicle, from the peripheral vehicle by vehicle-to-vehicle communication;

predicting a collision possibility between the self-vehicle and the peripheral vehicle based on self-vehicle information including a current position, a speed, and a traveling trajectory of the self-vehicle and the acquired peripheral vehicle information;

performing, when a first state is detected, a first display of displaying attention-calling information for calling attention to approach of the peripheral vehicle in a first period from a timing at which the first state is detected, the first state being a state in which the collision possibility is predicted and a start operation is performed by a driver of the self-vehicle; and performing, when a second state is detected, a second display of displaying direction information indicating an approach direction of the peripheral vehicle, the second state being a state in which the collision possibility is predicted, wherein update of the attention-calling information is suppressed in the first display until a second period shorter than the first period elapses from the timing even in a case where the first state is newly detected, and wherein the direction information is updated in the second display when the second state is newly detected even in a case where the second period does not elapse from the timing.

11. A non-transitory computer-readable storage medium storing a program for causing a computer to execute a driving assistance method of performing driving assistance for a self-vehicle, the driving assistance method including:

acquiring peripheral vehicle information including a current position, a speed, and a traveling trajectory of a peripheral vehicle present around the self-vehicle, from the peripheral vehicle by vehicle-to-vehicle communication;

predicting a collision possibility between the self-vehicle and the peripheral vehicle based on self-vehicle information including a current position, a speed, and a traveling trajectory of the self-vehicle and the acquired peripheral vehicle information;

performing, when a first state is detected, a first display of displaying attention-calling information for calling attention to approach of the peripheral vehicle in a first period from a timing at which the first state is detected, the first state being a state in which the collision possibility is predicted and a start operation is performed by a driver of the self-vehicle; and performing, when a second state is detected, a second display of displaying direction information indicating an approach direction of the peripheral vehicle, the second state being a state in which the collision possibility is predicted, wherein update of the attention-calling information is suppressed in the first display until a second period shorter than the first period elapses from the timing even in a case where the first state is newly detected, and wherein the direction information is updated in the second display when the second state is newly detected even in a case where the second period does not elapse from the timing.

* * * * *